United States Patent [19]
Miyazaki et al.

[11] Patent Number: 5,297,015
[45] Date of Patent: Mar. 22, 1994

[54] POWER SUPPLY CONTROL SYSTEM

[75] Inventors: Hideki Miyazaki; Ikuo Yamato; Kenichi Onda, all of Hitachi, Japan; Yasuo Matsuda, Eastchester, N.Y.; Yuzo Morita, Hitachi, Japan; Hidefumi Shirahama, Hitachi, Japan; Norikazu Tokunaga, Hitachi, Japan; Yutaka Suzuki, Hitachi, Japan

[73] Assignee: Hitachi, Ltd., Tokyo, Japan

[21] Appl. No.: 555,025

[22] Filed: Jul. 20, 1990

[30] Foreign Application Priority Data

Jul. 21, 1989 [JP] Japan ................... 1-187356
Aug. 11, 1989 [JP] Japan ................... 1-206804
Mar. 14, 1990 [JP] Japan ................... 2-063805

[51] Int. Cl.$^5$ ............... H02M 7/537; H02M 7/155; H01R 25/00
[52] U.S. Cl. .................... 363/146; 307/151; 315/291; 439/489; 439/679
[58] Field of Search ............. 307/149, 151; 363/146; 315/291, DIG. 5, DIG. 7; 439/346, 488, 489, 679

[56] References Cited

U.S. PATENT DOCUMENTS

| 2,085,639 | 6/1937 | Cowan ................. 307/149 |
| 2,297,188 | 9/1942 | Joyce ................. 307/149 |
| 3,755,686 | 8/1973 | Woods . |
| 3,935,505 | 1/1976 | Spiteri ................. 315/291 |
| 4,668,876 | 5/1987 | Skarman . |
| 4,689,493 | 8/1987 | Nozick et al. ................. 307/147 |
| 4,875,152 | 10/1989 | Foster ................. 363/146 |
| 4,915,639 | 4/1990 | Cohn et al. ................. 439/488 X |

FOREIGN PATENT DOCUMENTS

| 0151340 | 8/1985 | European Pat. Off. . |
| 0189918 | 8/1986 | European Pat. Off. . |
| 0301679 | 2/1989 | European Pat. Off. . |
| 2800472 | 7/1978 | Fed. Rep. of Germany . |
| 3528659 | 2/1987 | Fed. Rep. of Germany . |
| 3637669 | 5/1988 | Fed. Rep. of Germany . |

OTHER PUBLICATIONS

M. Weber, "Starkstromtechnik in modern Grossbauten", *V.D.E. Fachberichte*, . vol. 27, 1972, pp. 121-125.

P. Sood et al., "Power Conversion Distribution System Using a High-Frequency AC Link", *I.E.E.E. Transactions on Industry Applications*, vol. 24, No. 2, Apr./May 1988, pp. 288-299.

*Primary Examiner*—Emanuel T. Voeltz
*Attorney, Agent, or Firm*—Antonelli, Terry, Stout & Kraus

[57] ABSTRACT

A power supply control system including a variable power converter for converting electric power from a power supply to a load into that of a specification required by the load in response to a power specification information source provided on the load side. With a change in the load, the information source also changes, thereby providing a flexible power supply control system capable of meeting different loads. For applications to a high power supply, the system comprises a plurality of variable power converters adapted to operate selectively in accordance with requisite power information sources provided in or on the side of a plurality of loads, thereby providing a system realizing a flexible power supply. For application to a low power supply, the system comprises a plug having a power specification information source and a socket having a variable power converter.

27 Claims, 33 Drawing Sheets

POWER SUPPLY CONTROL SYSTEM

BACKGROUND OF THE INVENTION

The present invention relates to a system for controlling the power supplied from a power source to a load, or more in particular to a power supply control system capable of supplying electric power from a power source to a plurality of desired loads of different specifications or from a multiplicity of types of power sources to a plurality of loads having a variety of different specifications respectively.

In a high-power supply control system, the present invention preferably relates to a configuration and a method of controlling and operating a power supply system suitable for supplying electric power from a great variety of power sources to indoor services including various loads.

In a low-power supply control system, on the other hand, the present invention preferably relates to a system comprising a socket (convenience outlet) having a function of power conversion for connecting a power line to a plug connected to a desired load of a power specification different from that of the power line, and the plug having the function of the load power specification information.

A conventional power supply system for distributing large power to a plurality of loads, as described in "Mitsubishi Electrical Techniques", Vol. 60, No. 5, pp. 25-31 1986, supplies power from a commercial AC system to a load through a transformer. As a result, each load is required to have power conversion means to convert power into a form necessary for the particular load. Also, the conventional power supply system comprises two power transmission systems for normal and emergency services. Only the normal transmission system is used under normal conditions, while the emergency transmission system is operated only in case of emergency. The resulting lack of flexibility in the form of power supply makes it necessary to provide another power supply for preventing a power failure, thus posing a roadblock to reduction in the size of such a load system.

The failure to consider the flexibility of the form in which power is supplied to a load in the prior art prevents a load system from decreasing in size.

On the other hand, office automation (OA) equipments including home electric appliances and personal computers which receive relatively small power from a commercial AC power line have a respective power receiving cord with a plug making up their power input terminal, which is connected to a socket (convenience outlet) leading to the commercial power line. A socket in general use includes, as shown in FIG. 49, an input terminal connected to a commercial power line, and an output terminal to be connected to a load side plug 54, and a conductor for connecting the input and output terminals. The output terminal is replaceably constructed to facilitate the connection with or separation from the plug electrode 57. Also, the connecting portion of the commercial power line and the input terminal of the socket and the connecting portion of the output terminal and the plug electrode, are covered with an insulating material to prevent their complete exposure.

According to the above structure, the output voltage of the socket is equal to the commercial AC voltage applied thereto. On the load side, on the other hand, there is provided in many cases a switching power supply 84 for converting a commercial AC voltage received from the socket into a power level (DC 5 V, 12 V, etc.) required for driving the internal circuit of the load.

In the case of a load having a battery as a power supply, in order to make reception possible from a commercial power supply, an AC-DC converter 84 is often used. The converter 84 is inserted between a socket and a load side plug 54 as shown in FIG. 50 to convert a commercial AC voltage of 100 V into a DC voltages of 3 V or 1.5 V. The converter 84 is configured of a transformer 66, a rectifier 63 and smoothing means 82 as shown in FIG. 50. The taps of the transformer may be switchable by operating a tap switching means 83 provided on the surface of the converter body 84 to select an output voltage of 3 V or 1.5 V.

In the prior art described above, the voltage produced from the socket is a commercial AC voltage, and therefore, if the load needs the power of a different specification, it is necessary to insert power conversion means in the load or between the socket and the load.

SUMMARY OF THE INVENTION

Accordingly, it is an object of the present invention to provide an electric-power supply control system flexible enough to meet various demands relating to various loads.

Another object of the Present invention is to provide an economical electric-power supply control system intended for saving of supplied electric power and saving of its occupation energy and space in meeting various power specifications of loads.

Still another object of the present invention is to provide a power supply control system including power information means provided on the load side for presenting information on power specification demanded by the load and power conversion means for converting to supply to the load an electric power into that of the required specification in response to the information means.

According to one aspect of the present invention, there is provided an electric-power supply control system interposed between a power source and a load and transmitting power from the former to the latter: comprising power conversion means for variably converting the power from the power source into that of a desired specification; power specification information means on the load side for presenting the power specification information demanded by the load; control means responsive to the power specification information means for controlling the conversion means so that the conversion output of the conversion means meets the specification demanded by the load; and means for supplying the conversion output of the conversion means to the load.

It is also an object of the present invention to provide an electric-power supply control system wherein a plurality of power conversion means capable of generating power of different specifications are operated selectively between a power source and a plurality of loads in response to power specification information means provided on the load side for supplying power specification information demanded by the load respectively, thereby realizing a flexible power supply to the loads.

According to another aspect of the present invention, there is provided a power supply control system comprising power source means, a plurality of power conversion means capable of converting power from the power source means into power of different specifications, specification information means on the load side for providing information on the power specification demanded each load, and control means for operating the conversion means selectively in response to the information means thereby to supply power to the loads in flexible fashion.

A specific object of the present invention is to provide a high-power supply control system for supplying power flexibly, efficiently and economically to a plurality of loads from a plurality of variable power conversion means.

According to this aspect of the present invention, there is provided a power supply control system comprising a power source, a plurality of power conversion means for converting power from the power source, a plurality of loads driven by the power converted by the power conversion means, and means for selectively connecting the output terminals of the power conversion means to desired loads in accordance with a form of power required by each load.

An object of the present invention is therefore to provide a power supply control system capable of system maintenance and inspection without stopping power supply and also capable of stable power supply all the time.

Another object of the present invention is to provide a power supply control system intended for energy saving and space saving.

Still another object of the present invention is to provide a power supply control system capable of flexibly meeting variations in supplied electric power due to load variations.

Another specific object of the present invention is to provide a low-power supply control system for feeding a load and of the type receiving electric power through a plug connected to a socket making up a power source to the load, or more in particular to provide a socket with the power conversion function whereby the power received from a power supply line is converted into and produced as a voltage, current, frequency or other specification demanded by the load. The power conversion means is provided in the socket but not in the load.

A further object of the present invention, therefore, is to provide a high-function socket with a power conversion function capable of on-off controlling of power supply and diagnosing the current capacity of the load.

A still further object of the present invention is to provide a load power receiving system enabling elimination of conversion means conventionally required in the load or between the socket and the load, which is enabled by use of a socket having the power conversion function described above.

Still another object of the present invention is to provide a plug for transmitting a power specification required of a load to a socket having the above-mentioned power conversion function.

According to a power supply control system according to the present invention, using a plurality of power conversion means capable of by supplying electric power of various desired forms or specifications and capable of being selectively connected to various loads, significant advantages can be achieved such as making possible a flexible power supply, while at the same time permitting the system maintenance and inspection for a continuous and stable power supply without turning off the power source.

Further, the overall capacity of the power supply system is reduced with a high operation efficiency as compared with a maximum load capacity, thereby saving energy and space.

A socket with the power conversion function according to the present invention brings significant capabilities of permitting power to be supplied according to an optional specification demanded by a load and accordingly connecting various loads of different power specifications to a common power source, while at the same time improving the load efficiency. Also, the supply and intervention of power supplied to a load can be controlled by an external signal. Further, the function of diagnosing the current capacity of a load makes possible the load protection in case of an accident such as load short-circuiting. Furthermore, by supplying power to a load by use of a socket having the function of power conversion according to the present invention, the switching power source thus far needed in the load can be eliminated, thereby contributing to a reduced load size.

DESCRIPTION OF THE PREFERRED EMBODIMENTS

Figure 1:
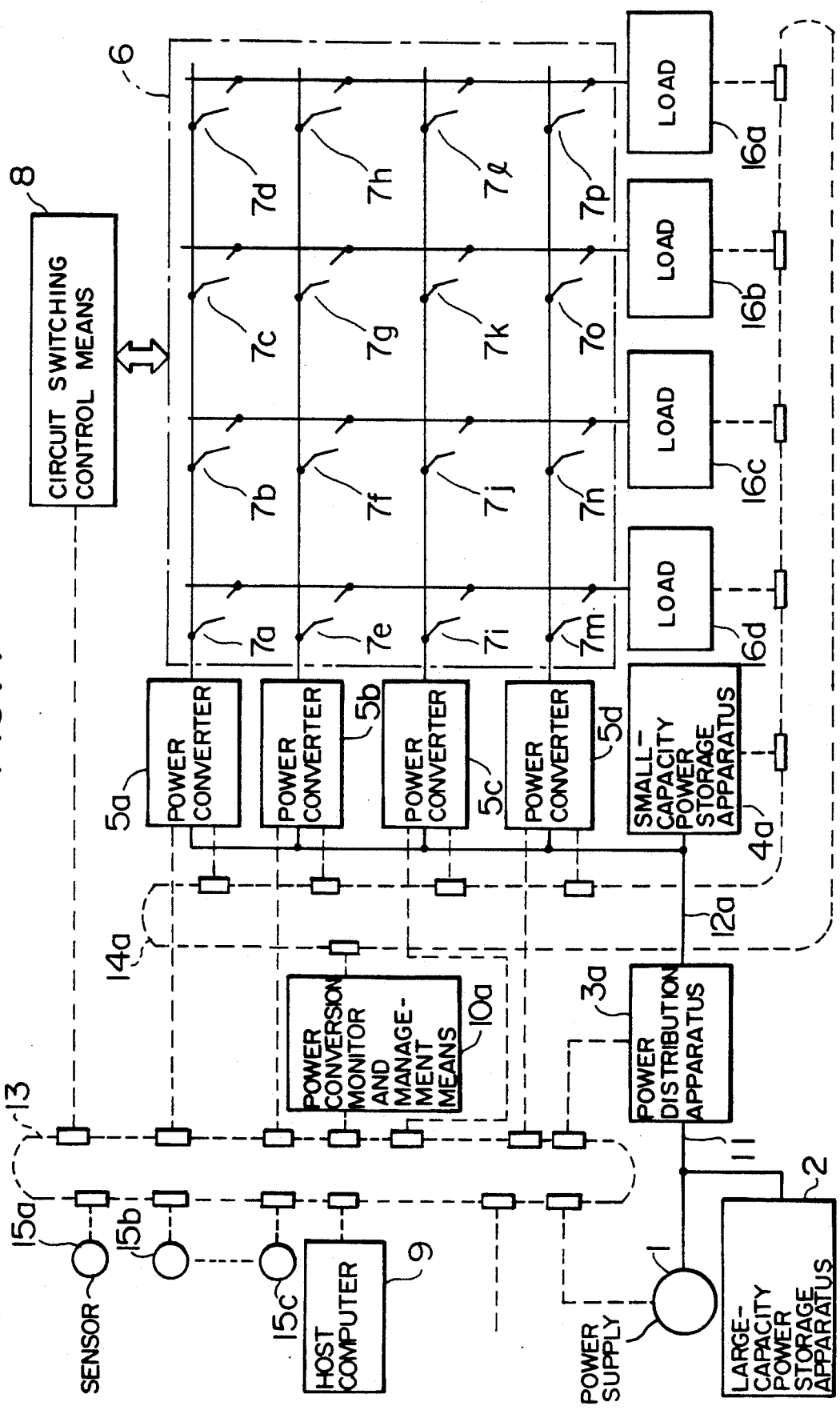
FIG. 1 shows a circuit configuration of one aspect of the present invention.
Figure 2:
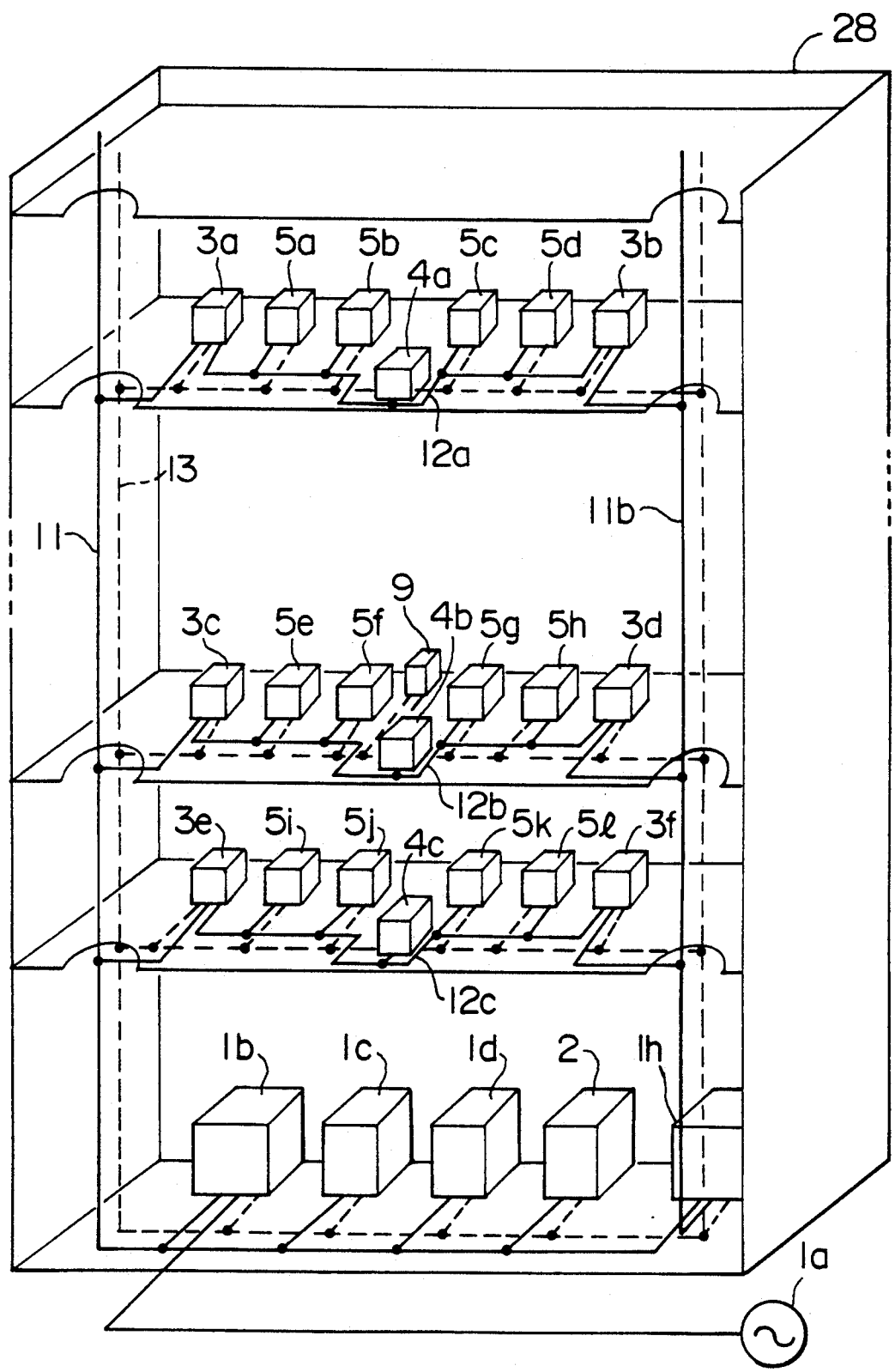
FIG. 2 is a diagram showing an application of the circuit configuration to a building.

A large-power supply control system according to an embodiment of the present invention will be explained below with reference to FIGS. 1, 2, 3A, 4A, and 4B. FIG. 1 shows a circuit configuration of the present invention, FIG. 2 shows a specific configuration of the present invention as applied to a power supply control system for a building 28, FIG. 3A a circuit configuration of power conversion means (or converter) according to the present invention, and FIGS. 4A and 4B diagrams for explaining the same circuit configuration.

First, in order to clarify the position or role of the present invention, the diagram of FIG. 2 will be explained. The shown power supply system uses a power source including a power receiving apparatus 1b supplied with electric power from an external power system 1a such as a commercial AC power system or power purchased from another building, a private power generation apparatus 1c, a cogeneration apparatus 1d, a large-capacity power storage system 2, a main power conversion system 1h or the like. The power from the power source is sent by power distribution apparatuses 3a to 3f through distribution lines 11, 11b to power conversion apparatuses (or power converters) 5a to 5l. As shown, a parallel connection of a plurality of power sources permits power to be supplied even when one of the power sources fails. In this way, a reliable power supply is available on the one hand, and the lowest-cost power is selected and supplied under the circumstances on the other. The main power conversion apparatus 1h converts commercial AC power into a power easily convertible into a form required by a load, that is, a direct current or a high-frequency AC power thereby to reduce the burden of the power receiving apparatuses 3b, 3d, 3f installed on each floor. As a result, the circuit configurations of the power receiving apparatuses 3b, 3d, 3f are simplified, thus improving the reliability and reducing the cost of the power supply system. Also, small-capacity power storage apparatuses 4a to 4c are installed on respective floors and, together with the large-capacity power storage apparatus 2, make up a decentralized power storage system, thereby effectively preventing any instantaneous Power failure against a load and leveling the load capacity against a power source. The leveling of the load capacity effectively reduces the equipment capacity of the power source. If the small-capacity power storage apparatus is responsive in high speed, and is coordinated with the large capacity-power storage apparatus in such a manner that an instantaneous power failure can be met by the small-capacity power storage apparatuses while a protracted power failure can be met and handled by the large-capacity power storage apparatus, then it is possible to configure a decentralized power storage system large in capacity and high in responsiveness. Further, each floor is supplied with the commercial AC power by a distribution line 11 on the one hand and a direct current or a high frequency AC power produced as an output of the power conversion apparatus 1h by the other distribution line 11b on the other hand. In case of a fault of one system, this double power transmission system permits power to be supplied from the other system, thus securing a stable power supply. Also, each apparatus may be subjected to an on-line operation and monitored by a host computer 9 through a communication line 13. Further, if a microcomputer is built in each power source and power conversion apparatus, the function of deciding on the selection of an operating condition for each apparatus is added, whereby the operating condition of each apparatus may be changed independently in accordance with the load demand thereof. In addition, each apparatus could continue to supply power to a load independently even in the case of a failure of the host computer 9.

FIG. 1 shows a detailed circuit configuration specifically ranging from the power conversion means 5a to 5d to each of the loads 16a to 16d. In this diagram, the power receiving apparatus 1b, the private power generation apparatus 1c, etc. are collectively represented by a power source 1. The feature of the shown circuit configuration is that a checkered network of power distribution lines is arranged between the power conversion means 5a to 5d (or power converters) and the loads 16a to 16d, with circuit switching means 6 having switches 7a to 7p arranged at crossings of the power distribution lines. As a result, by operating the switches 7a to 7p, a single power conversion means is capable of supplying power to a plurality of loads in accordance with the electric energy required of each load or a plurality of power conversion means connected in parallel may feed a single load. It is unlikely that all the loads will require their respective maximum power at the same time. If a plurality of power conversion means are operated in the abovementioned manner, therefore, it is possible to reduce the overall capacity of the power supply equipment as against the general load capacity and thus to realize an efficient power supply system. Further, an uninterrupted maintenance and inspection of the system may be effected by stopping only the power conversion means involved without halting the operation of the whole system. Furthermore, a power receiving apparatus 1b, a private power generation apparatus 1c, a cogeneration apparatus 1d, a large-capacity power storage apparatus 2, etc. are provided also for the power source as shown in FIG. 2, so that the maintenance and inspection are possible for each apparatus in stationary or quiescent state. The circuit switching means 8 is operated by a circuit switching control means 8 which receives a signal from the communication line 13 to decide on the switching. Normally, however, the power conversion means 5a to 5d and the circuit switching control means 8 are operated in compliance with an instruction from a power conversion monitor 10a in accordance with the load conditions. Assume, for example, that an air conditioning system in a building is a load. The power conversion monitor 10a first determines an indoor environment by environment sensors 15a to 15c including indoor temperature and humidity sensors, and then set an output of each load, that is, the air conditioner, lighting equipment or an acoustic system for controlling the indoor environment. With respect to the lighting equipment, not only the illuminance but also the color thereof may also be set. The explanation here will deal with the operation of each apparatus taking an air-conditioner as an example. First, the indoor environment is determined from the result of detection by the environment sensors 15a to 15c. In the next step, the output settings of each air conditioner (which may be set manually by temperature setting means provided in the air conditioner) are used to determine the electric energy, frequency, voltage or other power form required of the load, and send an operation command to the circuit switching control means 8 and the power conversion means 5a to 5d. The power conversion means 5a to 5d receive the information on the conditions of the circuit switching means 6 from the power conversion monitor 10a through a high-speed communication line 14a to determine a load to be power-fed. Further, the means 10a detects the conditions of the load to be power-fed, by the high-speed communication line 14a, and causes the power conversion means to supply power to the load. The host computer 9, in cooperation with the power conversion monitor 10a, grasps the conditions of the power source 1, the decentralized power storage apparatuses 2, 4a and the power distribution apparatus 3a, and operates the whole power supply system on the basis of the energy saving or other criterion.

This system is capable of supplying power continuously without down time of the whole system on a simple decision made by the circuit switching control means 8 or the power conversion means as described above even in the case of a failure of the power conversion monitor 10a. In FIG. 1, two communication lines including the communication line 13 and the high-speed communication line 14a are provided by reason of the fact that power supply to a load by the power conversion means 5a to 5d requires a high-speed communication of the information relating to the power form required of the particular load although the amount of information transmitted is small and that the management of the whole power supply system by host computer is accompanied by data having different characteristics requiring a large-capacity communication though low in speed. Exchange of information between the two communication lines is effected through the power conversion monitor 10a. Just in case the power conversion monitor 10a fails, however, a separate information exchange means (such as a multiple arrangement of monitors 10a) may be disposed between the two communication lines. Also, depending on the form of the power supply system, more communication lines may be required.

Figure 3A:
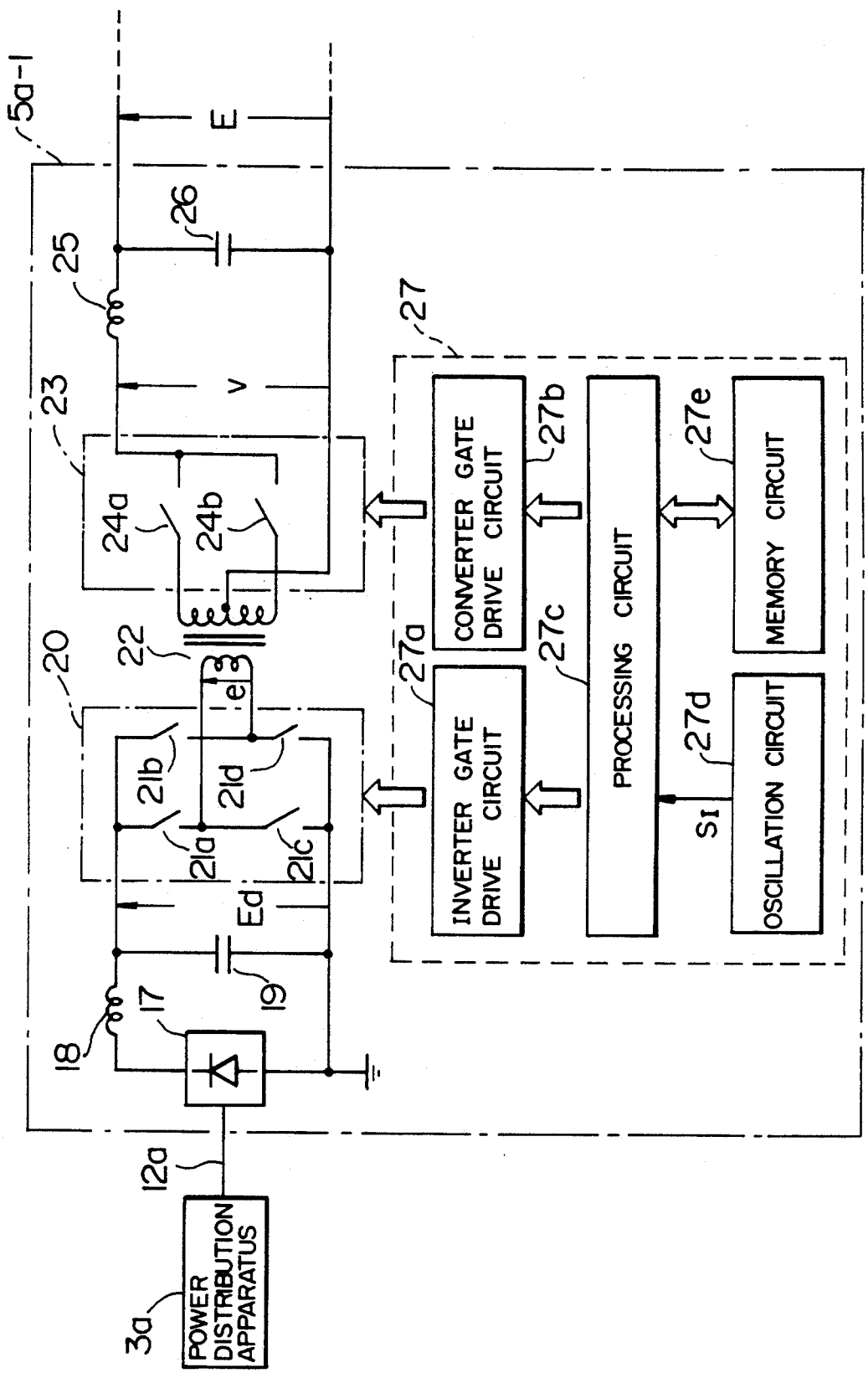
FIG. 3A shows a circuit configuration of a power converter means according to the present invention.

The loads 16a to 16d in FIG. 1 may include OA equipment, elevators, security/disaster-preventing equipment, general home-use electric appliances in addition to the air-conditioning system taken up above, so that the power conversion means 5a to 5d are required to supply power in a given voltage waveform in keeping with various load conditions. FIG. 3A shows a circuit configuration of a power conversion means intended to meet such a requirement. The power conversion means 5a-1 shown in FIG. 3A includes a diode rectifier 17, a filter circuit having a reactor 18 and a capacitor 19, an inverter circuit 20 for generating an AC voltage e from a DC voltage Ed produced as an output of the filter circuit, a transformer 22 for electric insulation, a converter circuit 23 for generating a given output voltage v from the AC voltage e, an output filter circuit having a reactor 25 and a capacitor 26, and a power conversion control circuit 27 for operating switching devices 21a to 21d in the inverter circuit 20 and switching devices 24a, 24b in the converter circuit 23. In he inverter circuit 20, the relationship $e=Ed$ is established when the switching devices 21a and 21d are turned on, while the relationship $e=-Ed$ is held when the switching devices 21b and 21c are turned on. In the converter circuit 23, on the other hand, the turning on of the switching device 24a leads to the relationship of $v=e$, while the turning on of the switching device 24b results in $v=-e$. This operation characteristic ensures the capability of producing a given voltage waveform from the power conversion means 5a-1. In order to realize this main circuit operation, the power conversion control circuit 27 includes an inverter gate drive circuit 27a, a converter gate drive circuit 27b, a processing circuit 27c, a memory circuit 27e and an oscillation circuit 27d. The processing circuit 27c is repeatedly energized by an interrupt signal $S_f$ produced as an output from the oscillation circuit 27d to perform the processing operation in compliance with the procedure required for operation of the inverter circuit 20 and the converter circuit 23 data of which procedure is stored in the memory circuit 27e, thereby operating the inverter gate drive circuit 27a and the converter gate drive circuit 27b.

Figure 4A:
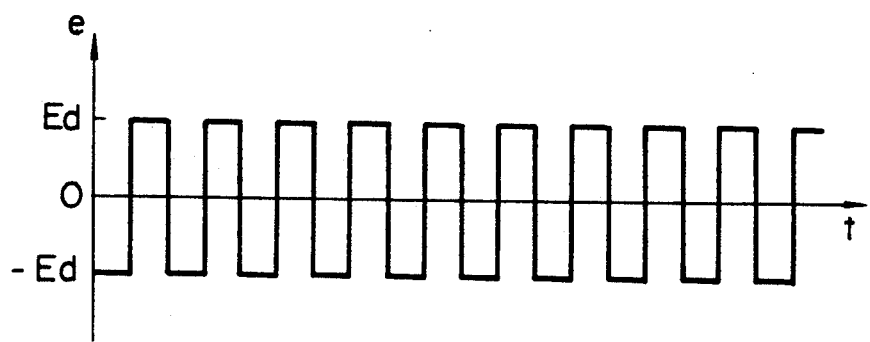
FIGS. 4A and 4B are diagrams for explaining the operation of the circuit of FIG. 3A.
Figure 4B:
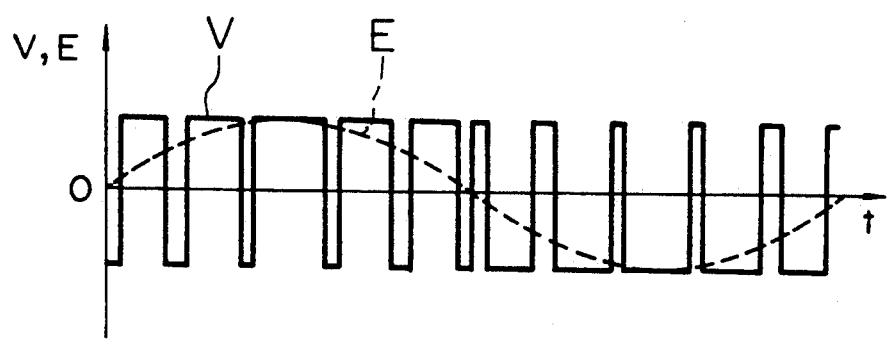

Operation waveforms for producing a sinusoidal output voltage in the circuit of FIG. 3A are shown in FIGS. 4A and 4B. FIG. 4A shows an output voltage waveform e of the inverter circuit, and the solid line in FIG. 4B shows a waveform of the voltage v for generating a sinusoidal wave by the converter circuit from the waveform shown in FIG. 4A. A sinusoidal wave voltage E shown by the dashed line in FIG. 4B is produced from the voltage waveform v through the output filter circuit including the reactor 25 and the capacitor 26.

Figure 3B:
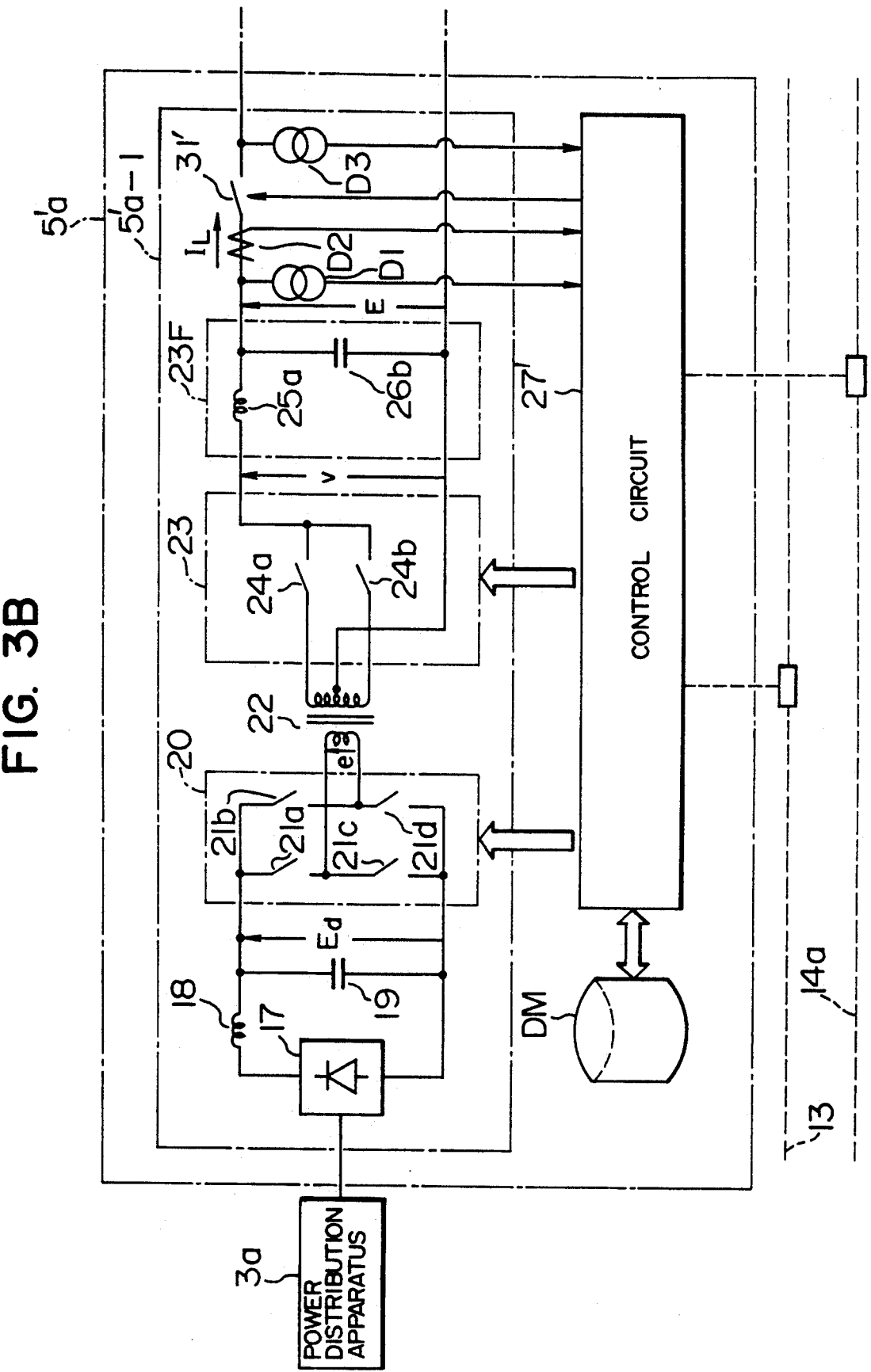
FIG. 3B is a diagram showing a plurality of power converters in parallel operation according to an embodiment of the present invention.

Also, FIG. 3B shows an embodiment in which a plurality of power converters may be operated in parallel by making use of an output filter circuit. In FIG. 3B, those component parts designated by the same reference numerals as corresponding parts in FIG. 3A show similar or identical component elements respectively. An output of a filter circuit 23F including a reactor 25a and a capacitor 26a is connected with voltage detectors D1, D3, a current detector D2 and a switch 31'. In accordance with outputs of these detectors, a memory circuit DM and a control circuit 27' control the switch 31' thereby to perform a parallel operation of a plurality of power converters 5'a.

The memory circuit DM holds a control program for realizing the control function of the control circuit 27'. The provision of the output switch 31', the voltage detection circuit D3 and the current detection circuit D2 is in order to permit parallel operation of the power converter 5'a and other power converters. In the case where a power converter 5'b (not shown) having a construction similar to that of the power converter 5'a already in operation is added to the power converter 5'a to perform a parallel operation of the two power converters 5'a and 5'b, the output terminals of the two power converters are connected by a switching circuit 6 such as shown in FIG. 1 first of all. After that, the power converter 5'a matches its output voltage waveform with the output of the power converter 5'b in response to such information as the voltage value, frequency and phase of the output voltage of the power converter 5'b by the voltage detection circuit D3 with the output switch 31' kept open. In the next step, the output switch 31' is closed, and the load current detected by the current detection circuit D2 to balance the load distribution during parallel operation.

As explained above, according to the power conversion means a load may be supplied with power in a given form in accordance with the various demands thereof.

Also, if a timer is built in the power conversion means 5a to set a power supply time, the energy loss is extremely reduced as power is supplied in accordance with the driving time of the load.

Further, in the case where a single load (such as the one designated by 16a) is supplied with power from a plurality of power conversion means (5a to 5d) by means of the circuit switching means 6, the power available from a single power conversion means (5a) may be set freely in the range from 0% to 100% while limiting the power supply capability of the remaining power conversion means (5b 5d) to 0% or 100%, in which case power of the desired amount can be supplied to the load 16a, while at the same time reducing the power loss, improving the service life of the power conversion means and simplifying the control functions.

Figure 5:
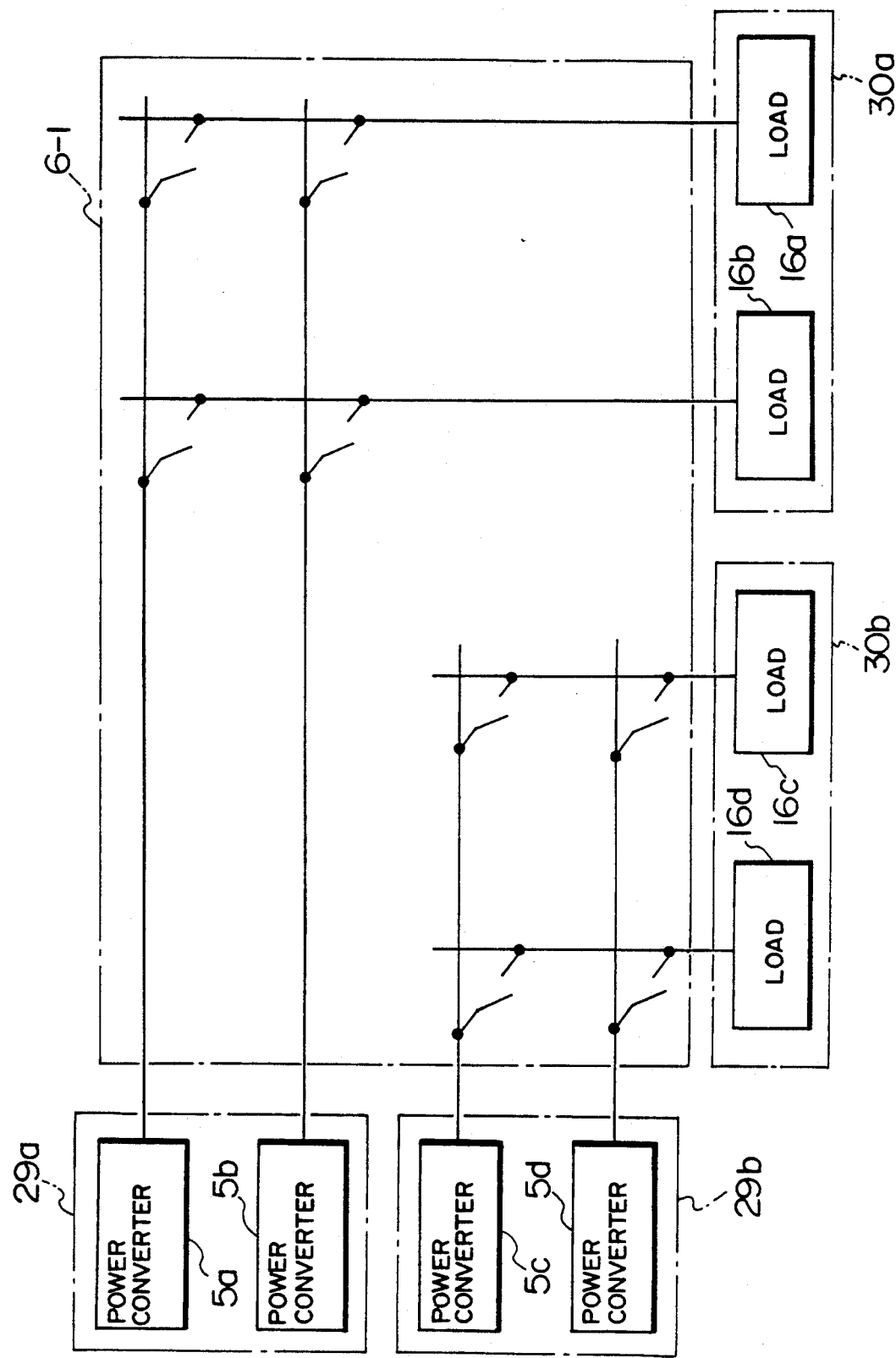
FIGS. 5, 6 and 7 show other embodiments of circuit switching means used in the circuit of FIG. 1.
Figure 6:
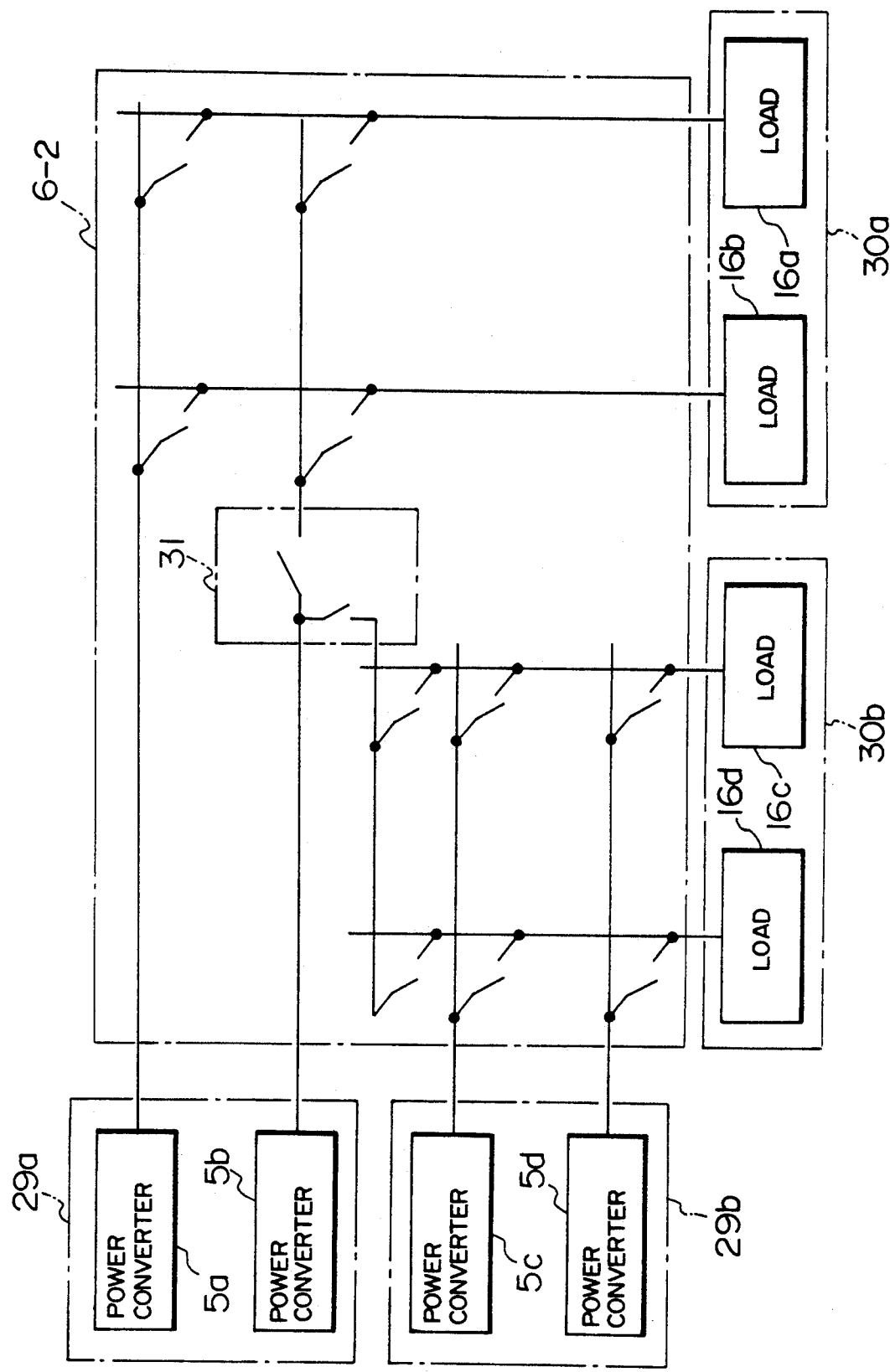
Figure 7:
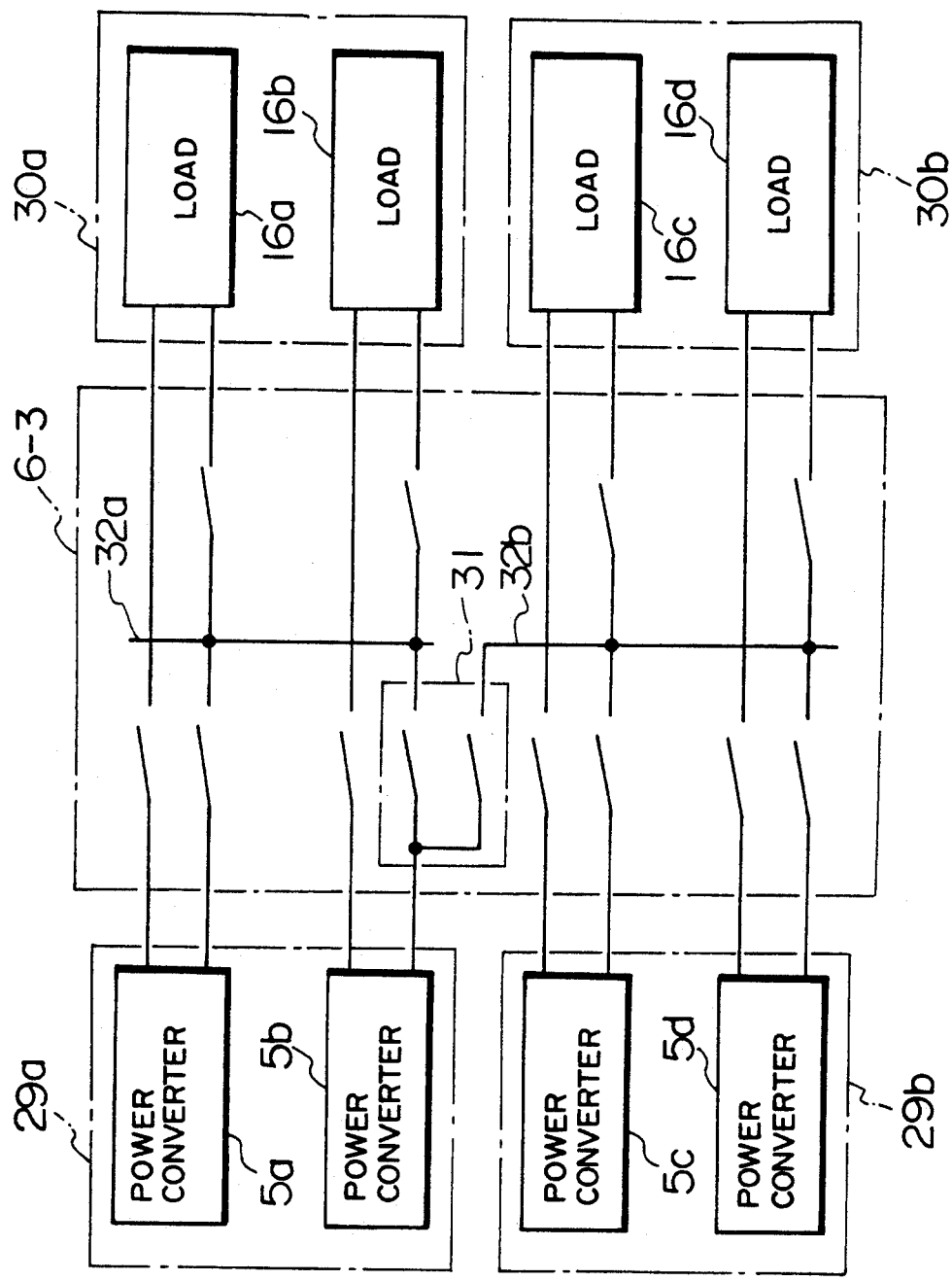

FIGS. 5, 6 and 7 show other embodiments 6-1 to 6-3 of the circuit switching means 6 of FIG. 1. In FIG. 5, the power conversion means 5a to 5d are classified into power converter groups 29a and 29b, and the loads 16a to 16d into load groups 30a and 30b, so that the circuit is switchable only between the power converter group 29a and the load group 30a or between the power converter group 29b and the load group 30b, thereby reducing the number of lines and switches in the circuit switching means 6-1.

The configuration of FIG. 5, however, is unable to freely exchange electric power between the power converter group 29a and the power converter group 29b. The configuration 6-2 shown in FIG. 6, on the other hand, further includes group switching means 31 to make possible power exchange between different groups to some extent. By doing so, stable power is capable of being supplied in accordance with the degree of importance of a particular load. Also, the number of switches in the circuit switching means 6-2 may be reduced by use of common power lines 32a, 32b as shown in FIG. 7. Although the decreased number of switches may deteriorate the flexibility of power supply, the reliability of the system as a whole is improved and the cost of the power supply system reduced.

Figure 8:
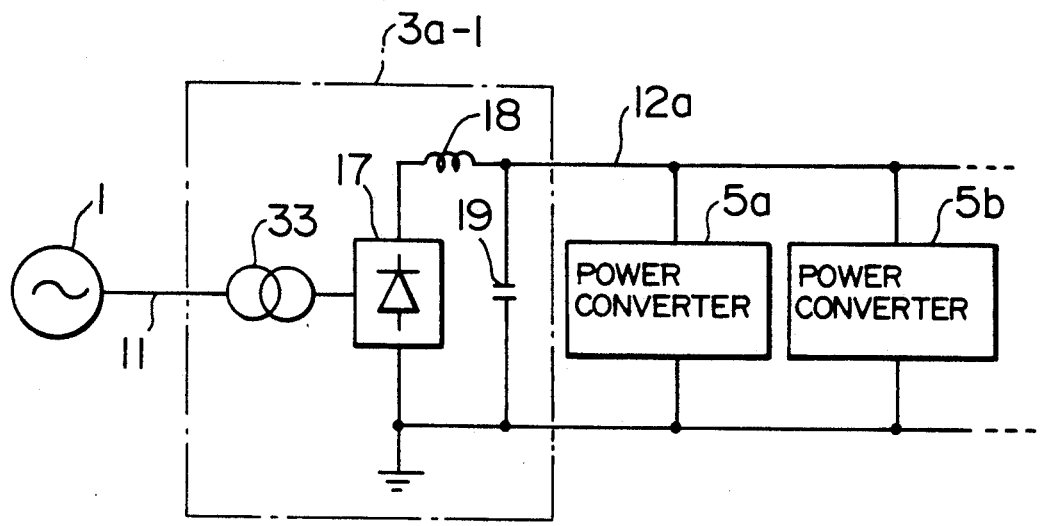
FIGS. 8, 9, 11, 13, 14 and 15 show different examples of a power distribution apparatus according to this invention.

FIGS. 8, 9, 11, 13, 14 and 15 show embodiments relating to the power distribution apparatus 3a. Configurations of the power conversion means 5a using the power distribution apparatus 3a are shown in FIGS. 10 and 12. FIG. 8 shows a configuration of a power distribution apparatus 3a-1 having built therein the transformer 33 for electric insulation, the diode 17, the filter circuit having the reactor 18 and the capacitor 19. In this case, although the power distribution apparatus 3a-1 becomes somewhat bulky, the diode 17 and the filter circuit having the reactor 18 and the capacitor 19 may be eliminated from each of the power conversion means 5 installed in great numbers as shown in FIG. 10, thus reducing the equipment capacity of the whole system. (The same devices installed in multiplicity or overlap mode are replaced by a common one set of such devices collectively installed in common.)

Figure 9:
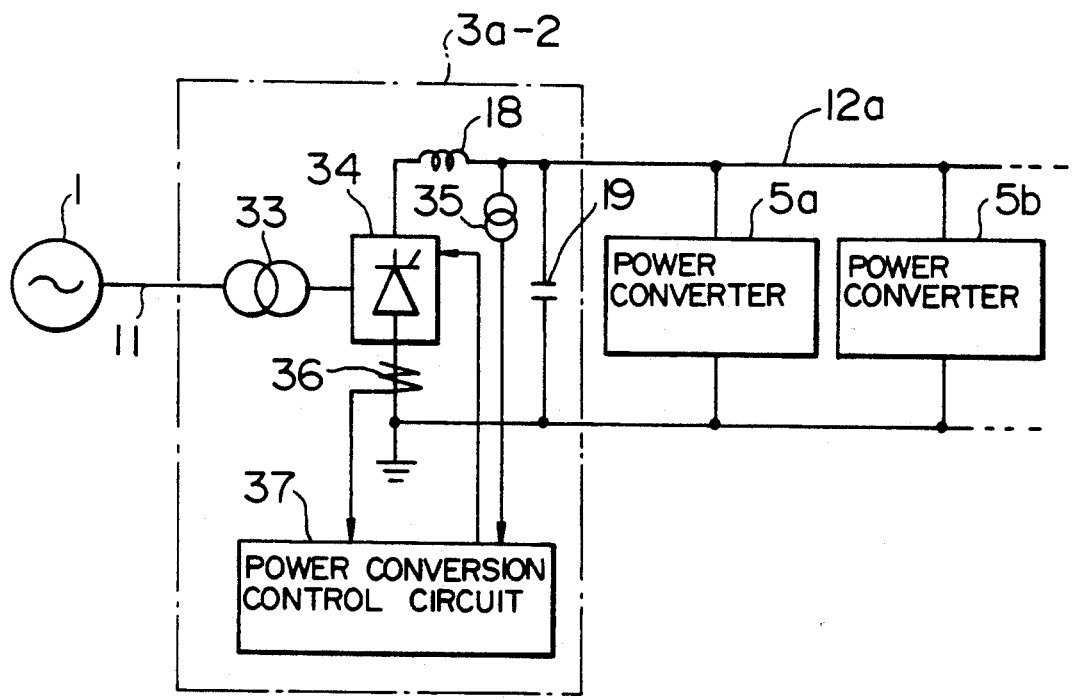
Figure 10:
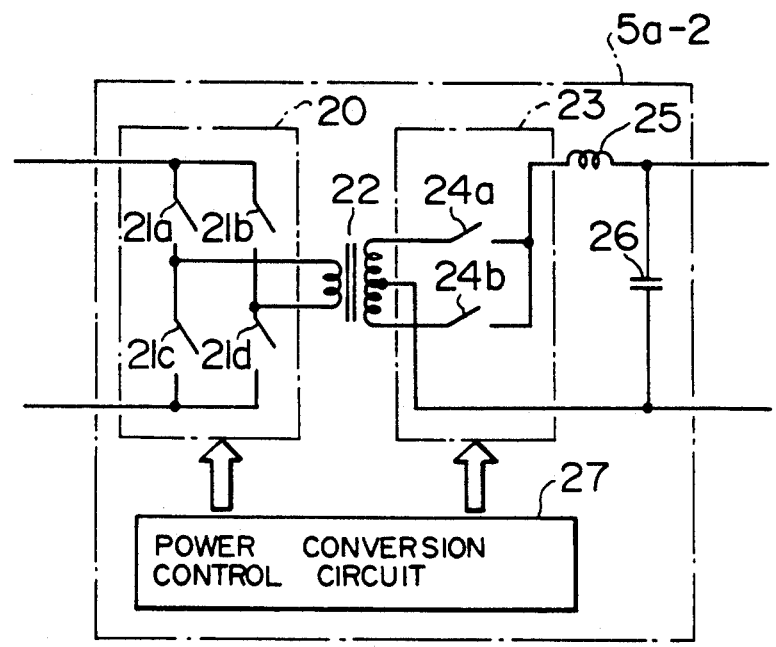
FIGS. 10, 12 and 21 show different examples of power converter means according to this invention.

FIG. 9 shows a configuration in which the diode rectifier 17 in FIG. 8 is replaced by a thyristor converter 34, further including a voltage detector 35, a current detector 36 and a power conversion control circuit 37. Since the magnitude of the DC output voltage may be changed by phase control of the thyristor converter 34, the equipment is protected by preventing an overcurrent in case of a short-circuiting accident on the DC side.

FIG. 10 shows a circuit configuration of the power conversion means using the power distribution apparatus 3a-1 or 3a-2 shown in FIG. 8 or respectively. In FIG. 10, as described above, the filter circuit of FIG. 3A is installed on the side of the power distribution apparatus 3a-1 or 3a-2 there by to simplify the configuration and reduce the size of the power conversion means. At the same time, the other power conversion means 5b to 5d are of course configured in similar fashion.

Figure 11:
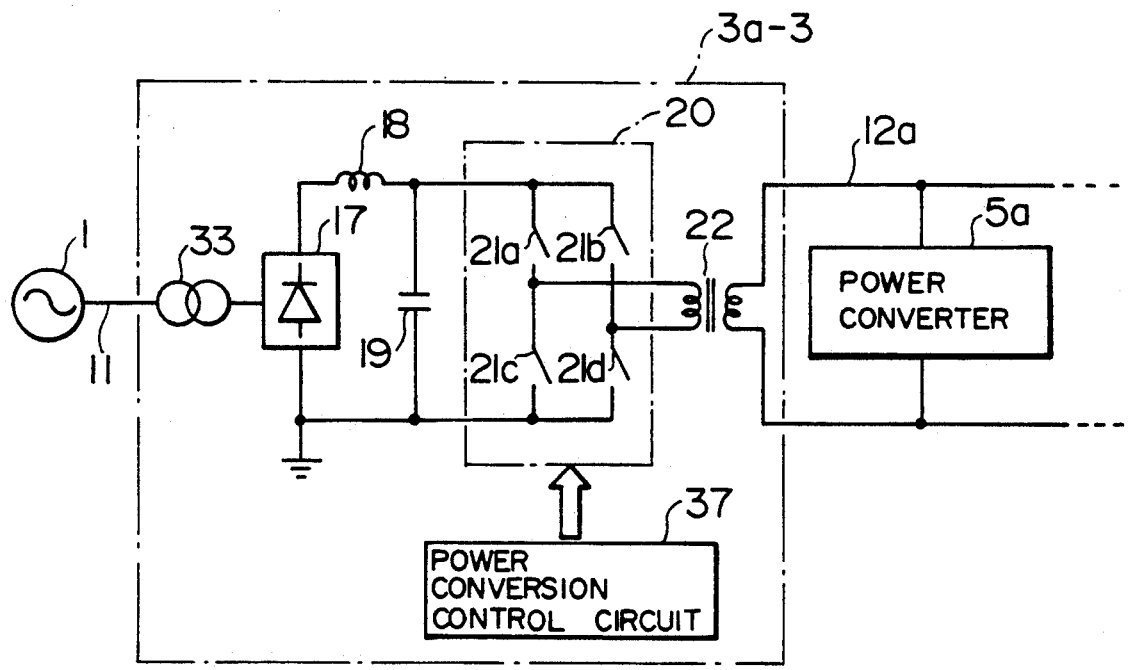
Figure 12:
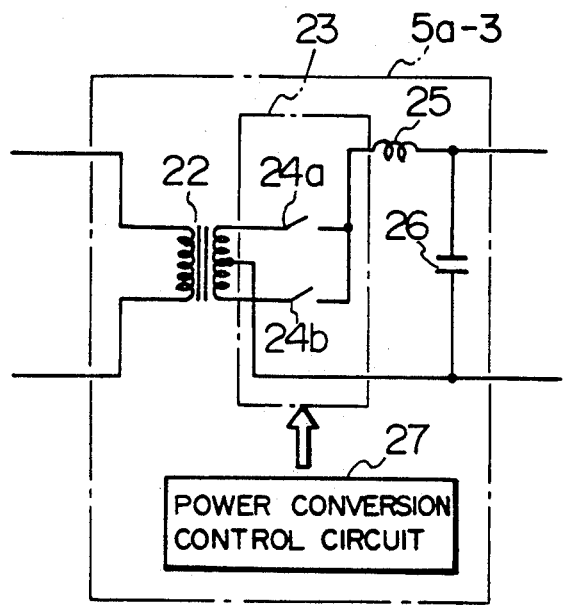

FIG. 11 shows a configuration in which the inverter circuit 20 for converting DC power into AC power is also incorporated in the power distribution apparatus 3a-3, in which case each power conversion means may lack the inverter circuit, resulting in a simple circuit configuration as shown in FIG. 12 including only a transformer 22, a converter circuit 23, and an output filter circuit having a reactor 25 and a capacitor 26.

Figure 13:
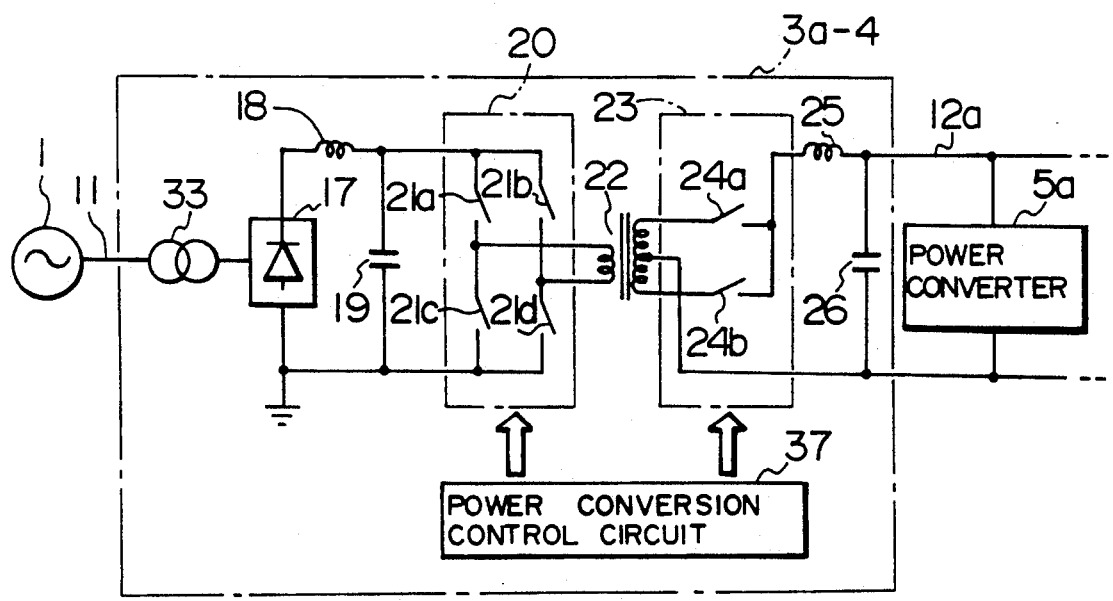

A configuration having the function of FIG. 3A added to the power distribution apparatus 3a-4 is shown in FIG. 13. In this configuration, the power distribution apparatus 3a-4 is adapted to form a given voltage waveform such as a rectangular, trapezoidal or frequency-multiplexed one. If power is supplied to the power conversion means 5a to 5d in frequency multiplex form, for example, each power conversion means may be configured only of a filter circuit for frequency separation, and therefore the overall power conversion means is reduced in size while at the same time improving the system reliability.

Figure 14:
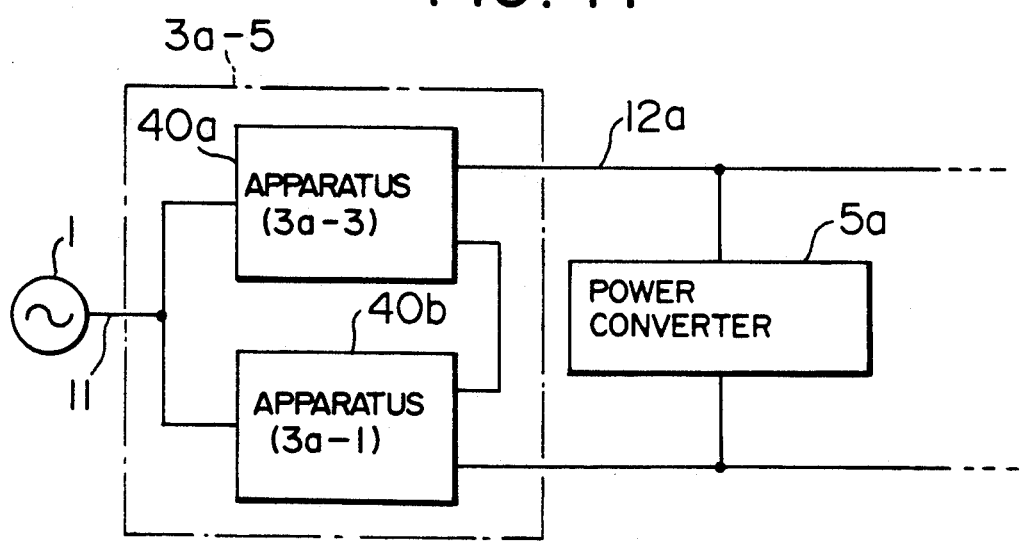

FIG. 14 is a diagram showing the power distribution apparatus 3a-5 comprising a power distribution 3a-3 of FIG. 11 as a block 40a and that (3a-1) of FIG. 8 as a block 40b connected in series to each other. In this case, a DC-AC superimposed waveform may be formed by the power distribution apparatus 3a-5 for simultaneous transmission of AC and DC powers, with the result that it becomes easy for each power conversion means to convert power into a form required of a particular load.

Figure 15:
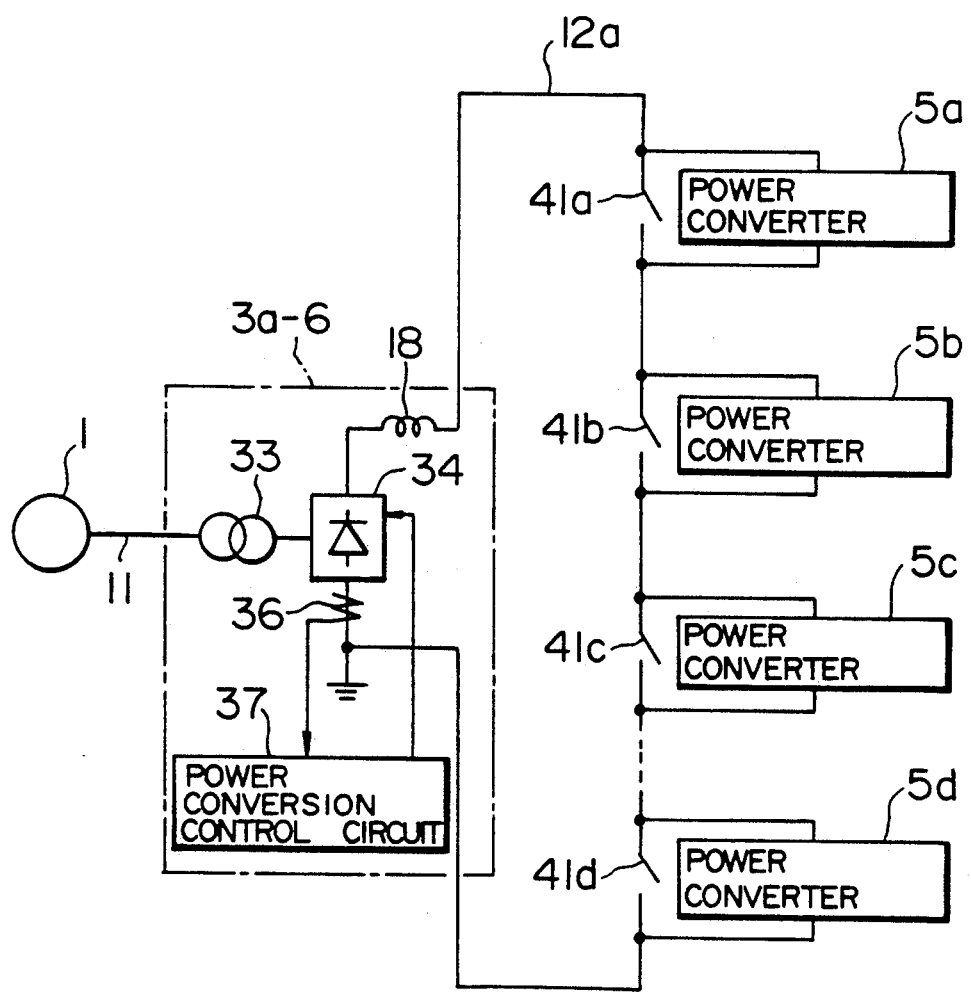

FIG. 15 shows a modified configuration 3a-6 in which the current of the power distribution apparatus 3 in FIG. 9 is controlled as a current source. In this configuration, if a superconducting coil is used as the reactor 18, the function of storing electric power is added, thus realizing a compact, efficient power storage means. In such a case, the power conversion means 5a to 5d may be connected or disconnected by operating the switches 41a to 41d.

If the circuit configuration of the power distribution apparatus 3a shown in FIG. 8, 9, 11, 13, 14 or 15 is applied to the main power conversion means 1b, the power distribution apparatus is reduced in size, thereby further saving the equipment capacity of the system as a whole.

Figure 16:
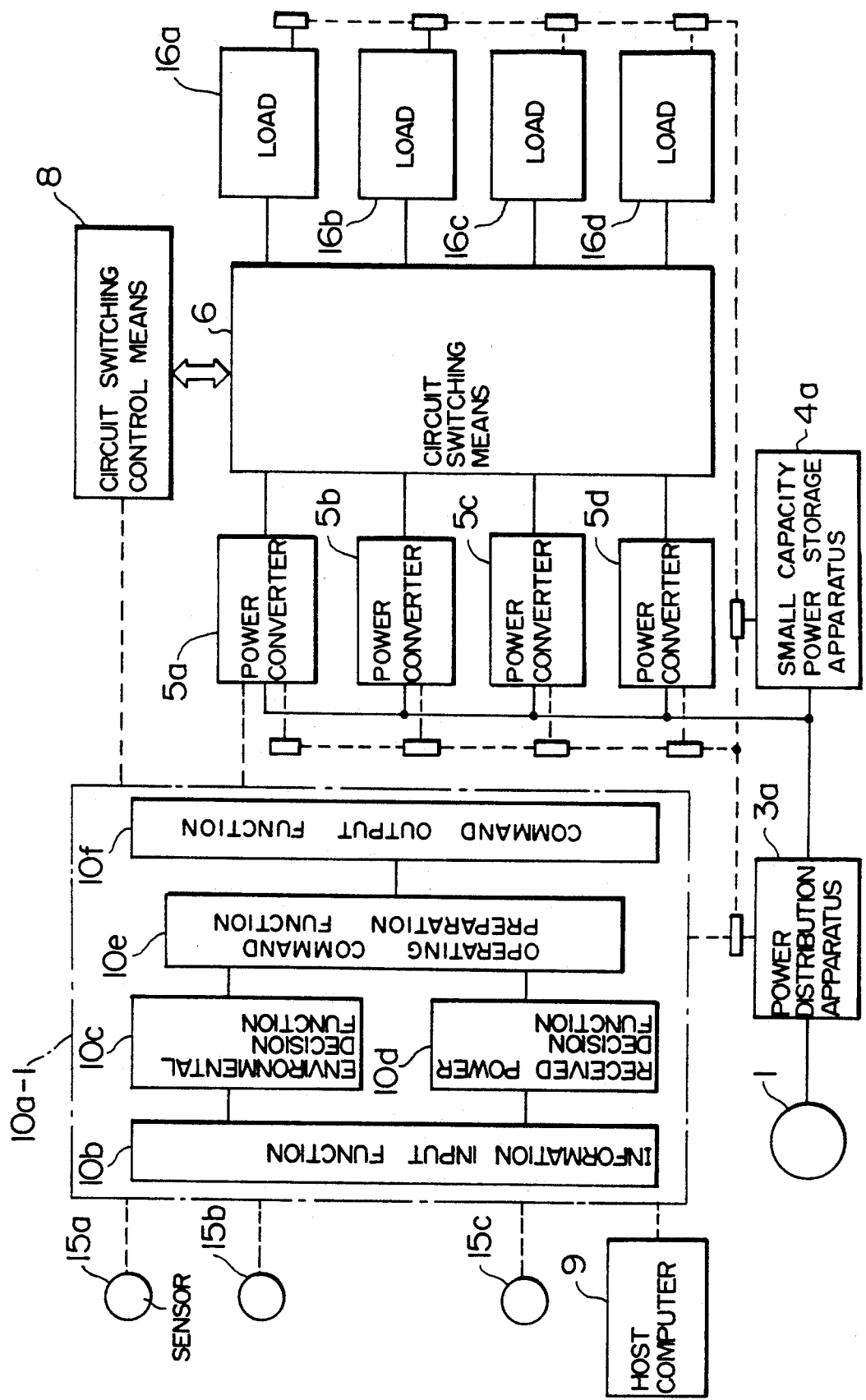
FIGS. 16 and 17 are diagrams showing different examples of a power conversion monitor according to this invention.
Figure 17:
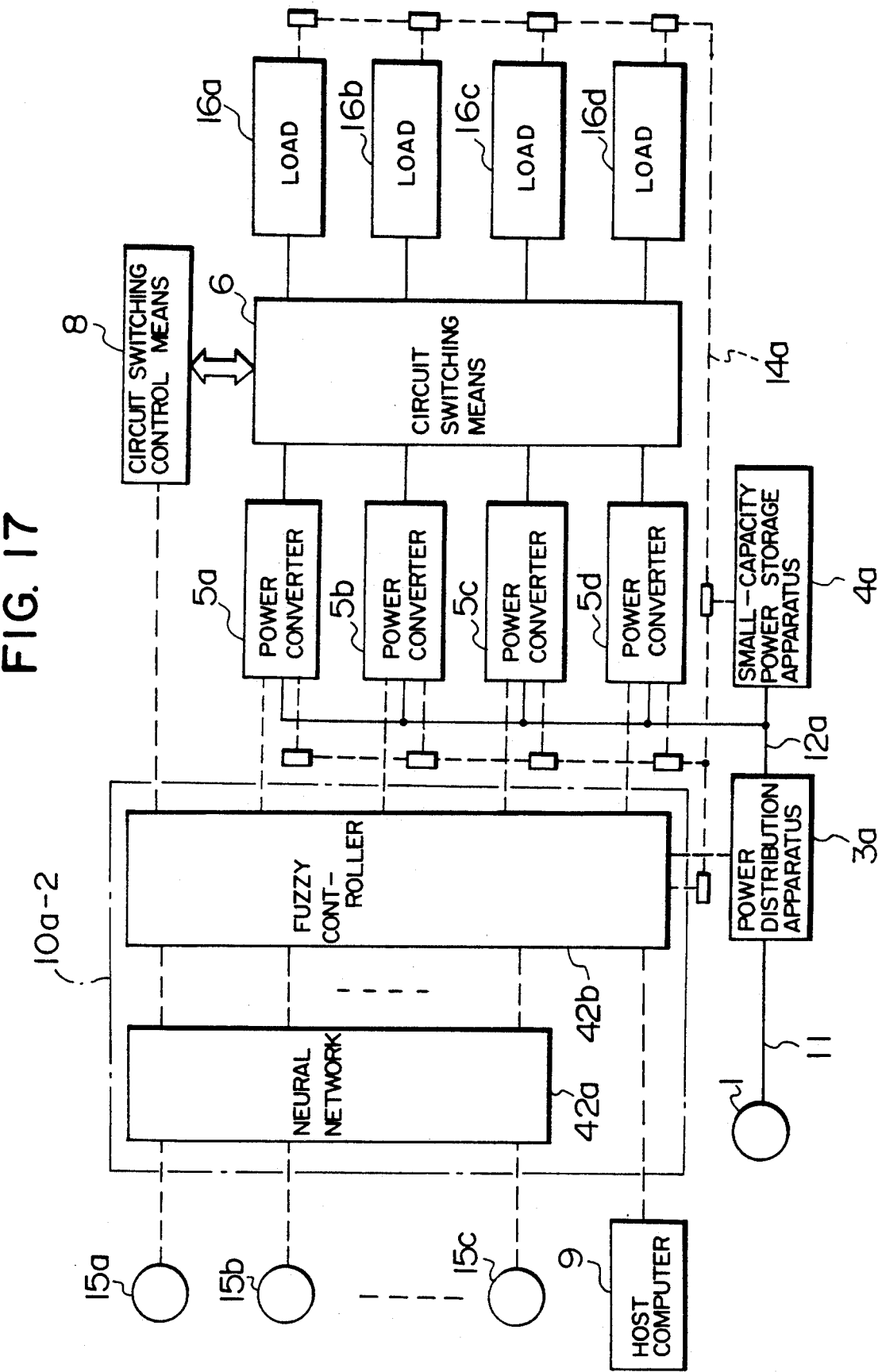
Figure 18:
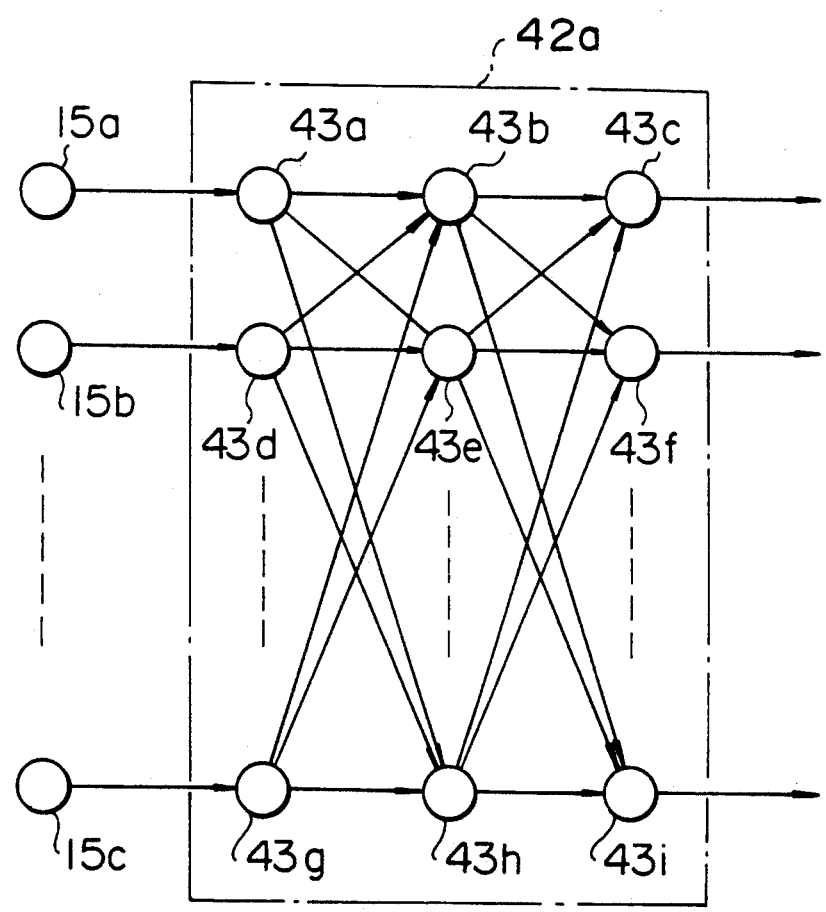
FIGS. 18 and 19 are diagrams for explaining the monitor in detail.
Figure 19:
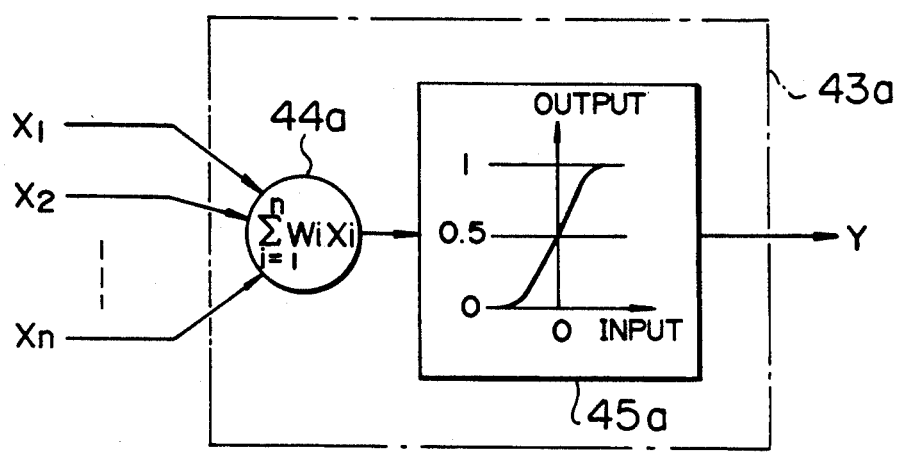
Figure 20A:
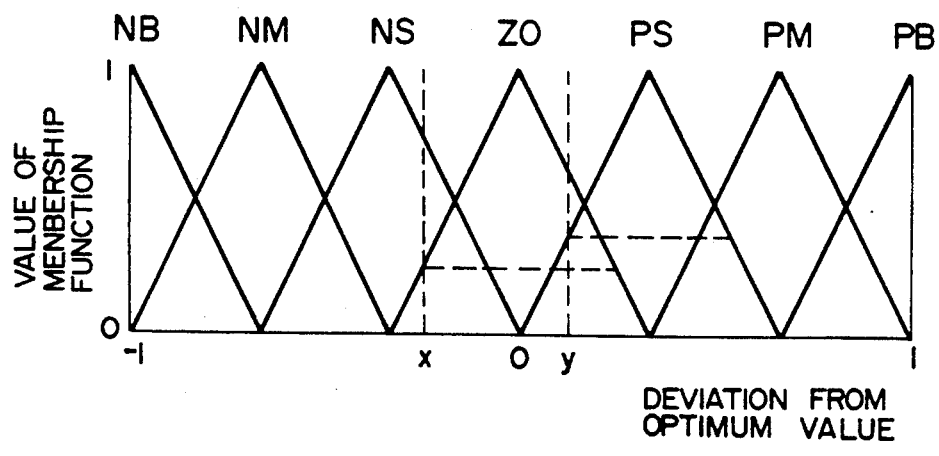
FIGS. 20A and 20B are diagrams for explaining the operation of the monitor shown in FIG. 19.
Figure 20A:

FIG. 16 is a diagram showing an embodiment 10a-1 of the power conversion monitor means 10a, FIG. 17 shows another embodiment 10a-2 of the power conversion monitor means 10a, FIGS. 18 and 19 show a detailed internal configuration of the embodiment shown in FIG. 17, and FIG. 20 shows a diagram for explaining the operation of the embodiment shown in FIG. 19. In FIG. 16, the power conversion monitor means 10a-1 has various functions including an information input function 10b for collecting information on the environment in a building considered necessary for operating the power converter means 5a to 5d and the circuit switching means 8, an environmental decision function 10c for deciding on the information thus collected, a received power decision function 10d for deciding on the power receiving condition in the building, an operation command preparation function 10e for preparing an operation command for the power converter means 5a to 5d and the circuit switching control means 8 from the information collected and the result of decision on the power receiving condition, and a command output function 10f for producing an operation command thus prepared. A specific example of the operation of the power conversion monitor means 10a-1 will be explained. Assume, for instance, that the loads 16a to 16d are air conditioners. The environmental sensors 15a to 15c arranged dispersively in the building collect the indoor temperature, humidity and other environmental information by way of the information input function 10b, followed by the energization of the environmental decision function 10c for determining the error of the temperature and humidity from values comfortable to a human being. Further, the conditions of the loads 16a to 16d, the power converter means 5a to 5d and the small-capacity power storage means 4a as well as the information on the power receiving condition of the whole building from the host computer are collected through the information input function 10b, and the present power availability of each apparatus is determined by the received power decision function 10d. In the next step, which power conversion means should be used to transmit power of what specification to what degree is determined by the operation command preparation function 10e in order to attain an optimum indoor environment for the human being with a magnitude of power available from the power supply system. Then the command output function 10f prepares an operation command for actuating the power converter means 5a to 5d and the circuit switching control means 8, while at the same time transmitting a control command to the power converter means 5a to 5d and the circuit switching control means 8. In this way, the provision of the power converter monitor means 10a-1 permits power to be supplied efficiently satisfying the requirements of the whole system. It is also possible to add the function of this power conversion monitor means 10a-1 to each power converter means.

Another embodiment of the power conversion monitor means 10a is shown in FIG. 17. This embodiment includes a neutral network 42a preferably formed for decision or judgement as a pattern like the indoor environmental information and a fuzzy controller 42b suited for soft environmental control meeting the sensitivity of the human being such as the feeling temperature. The neutral network 42a shown in the drawing includes a plurality of neurons 43a to 43i as shown in FIG. 18. These neurons are roughly divided into input layers 43a, 43d, 43g for receiving a signal from an external source and producing an output to the next neutron layer, intermediate layers 43b, 43e, 43h for weighting (magnifying) the signal from the input layers and applying an output to the neurons of the next layer, and output layers 43c, 43f, 43i for performing the same operation as the intermediate layer but producing only a single output to the outside. The indoor environmental information detected by the environment sensors 15a to 15c are applied to the input layer, and through the intermediate layer of a predetermined weight, a value corresponding to the error between a comfortable environment and the prevailing indoor environment, such as a temperature or humidity error, is produced from the output layer. Each neuron is comprised of a sum-of-products function 44a and a non-linear function 45a as shown in FIG. 19. By setting a value of the magnification $W_i$ of the input signal $X_i$ in FIG. 19, the relationship between the output signal Y and the input signals $X_1$ to $X_n$ is determined as desired. Specifically, if these neurons are configured as shown in FIG. 18 and the magnification value $W_i$ for each neuron is adjusted in advance in accordance with the indoor conditions, the above-mentioned errors of the indoor environment are obtained as an output. If this neural network 42a is used, an error from the optimum environment for the human being is detectable in relation to various indoor conditions by changing the value of the magnification $W_i$ (i: integer) of the input signal $X_i$ of each neuron. Also, the value $W_i$ may be determined automatically by adding the learning function.

Now, the operation of the fuzzy controller 42b will be explained with reference to FIGS. 20A and 20B. FIG. 20A represents seven membership functions with an error from the optimum value of the indoor environment as a parameter, each indicating the distribution of PB (Positive Big), PM (Positive Medium), PS (Positive Small), ZO (Zero), NS (Negative Small), NM (Negative Medium) and NB (Negative Big) respectively. Each membership function reflects a statistical distribution relating to human sensitivity. For example, ZO represents a distribution of the probability of an error which a man feels from an optimum environment.

Figure 20B:
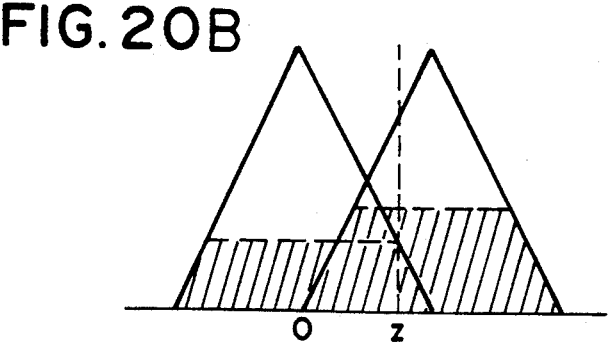

Taking advantage of the membership functions shown in FIG. 20A, and if the temperature error is indicated by x and the humidity error by y, then a region hatched in FIG. 20B is obtained from ZO associated with the minimum membership function having a value of x and PS associated with the minimum membership function having a value of y. A value of z is obtained from the center of gravity of this region and the magnitude of power supplied to a corresponding load is changed by this value z, thus making it possible to maintain an optimum indoor environment. As a result, such an operation command is prepared as to energize the power conversion means 5a to 5d and the circuit switching control means 8 to secure an optimum indoor environment for the human being, thus making it possible to operate the power conversion means 5a to 5d and the circuit switching control means 8 accordingly. In this way, an environment or atmosphere felt by the human being as optimum is maintained by forming the above-mentioned membership functions corresponding to the factors of human sensitivity like the feeling temperature.

The power conversion monitor means 10a described above permits the indoor environment to be maintained in an optimum condition for the human being and a wasteless air-conditioning operation to be performed meeting the sensitivity of the human being, thus saving energy effectively.

Further, it is possible to secure power supply to an important load in case of emergency such as an instantaneous power interruption by storing the required electric energy and the degree of importance of each load in the power conversion monitor means 10a.

Figure 21:
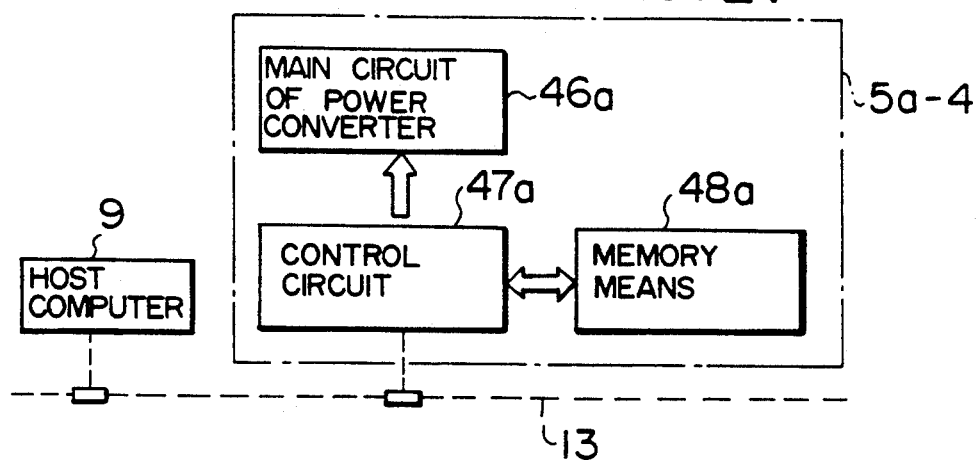

Now, a method of managing the system by the host computer 9 will be explained with reference to FIGS. 21, 22A and 22B. A successful management of a system requires a function of identifying each component apparatus. For this purpose, each apparatus is equipped with memory means for storing an identification code. FIG. 21 shows an example of the power conversion means 5a-4 having memory means 48a, which is operated by a control circuit 47a of the power conversion means 5a-4. Specifically, the control circuit 47a receives an identification code assigned by the host computer 9 through a communication line 13 and stores it in the memory means 48a. On the other hand, the identification code stored in the memory means 48a in accordance with the demand from the host computer 9 is produced on the communication line 13. A block 46a designates a main circuit of the power conversion means 5a-4. By incorporating this memory means in each component apparatus, the host computer 9 is capable of identifying each component apparatus and managing the whole power supply system, while at the same time facilitating the addition to or elimination from the component apparatuses or change in the system configuration simply by changing the identification code. Further, if the function of automatic preparation or operation of an identification code is added to the host computer 9, the user of the power supply system is capable of expanding or altering the system functions easily without being conscious of the identification code.

Figure 22A:
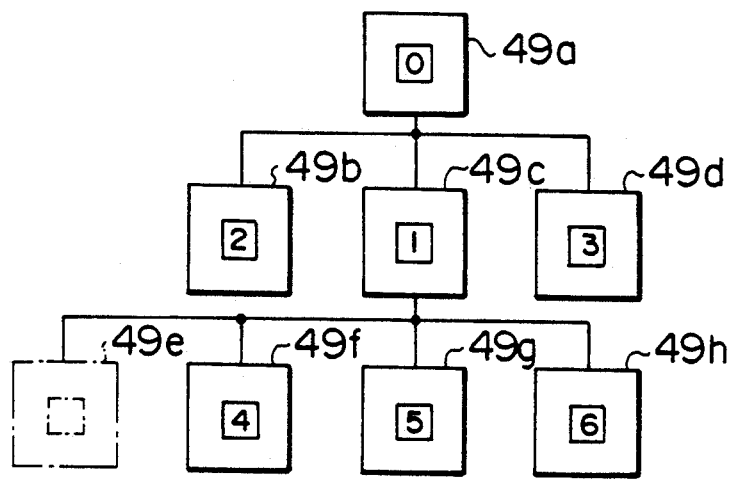
FIGS. 22A and 22B are diagrams for explaining a method of operating memory means.
Figure 22B:
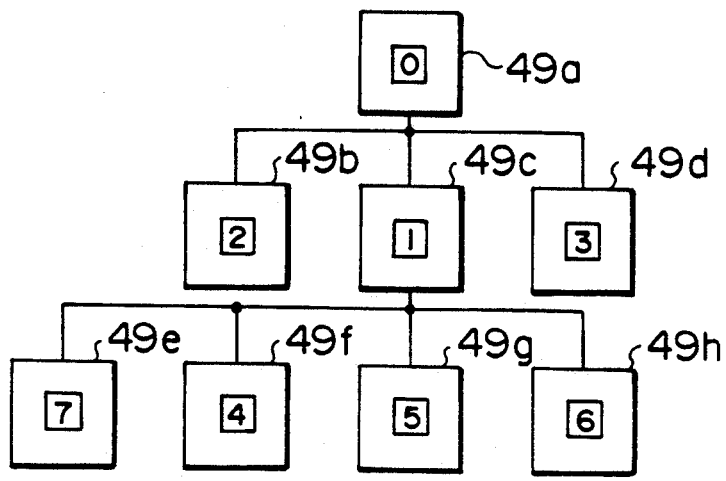

FIGS. 22A and 22B are diagrams for explaining a method of operating the memory means. First, assume that a system is configured of apparatuses 49a to 49d and 49f to 49h with the apparatus 49e connected to the system as shown in FIG. 22A. Assume that the apparatus have identification codes shown in the drawings as a condition before connecting the apparatus 49a. At the time of connection of the apparatus 49e, the identification code of the apparatus 49e is not defined as yet. This is sensed by the host computer 9 and an identification code (7 in this present case) different from those of the remaining apparatuses is automatically prepared and written in the memory means in the apparatus 49e, thereby making up a configuration as shown in FIG. 22B. The specifications of the apparatuses may be stored together with the identification codes mentioned above to realize an efficient management. By adding this function to the system, the host computer 9 is capable of managing each apparatus by identification code. Also, the automatic preparation of an identification code by the host computer 9 facilitates a system change. Further, a faulty apparatus is easily identified to minimize the effect of the fault, thereby to contribute to a reliable system. Furthermore, it is possible to determine an important load and a power transmission command by this host computer.

Figure 23:
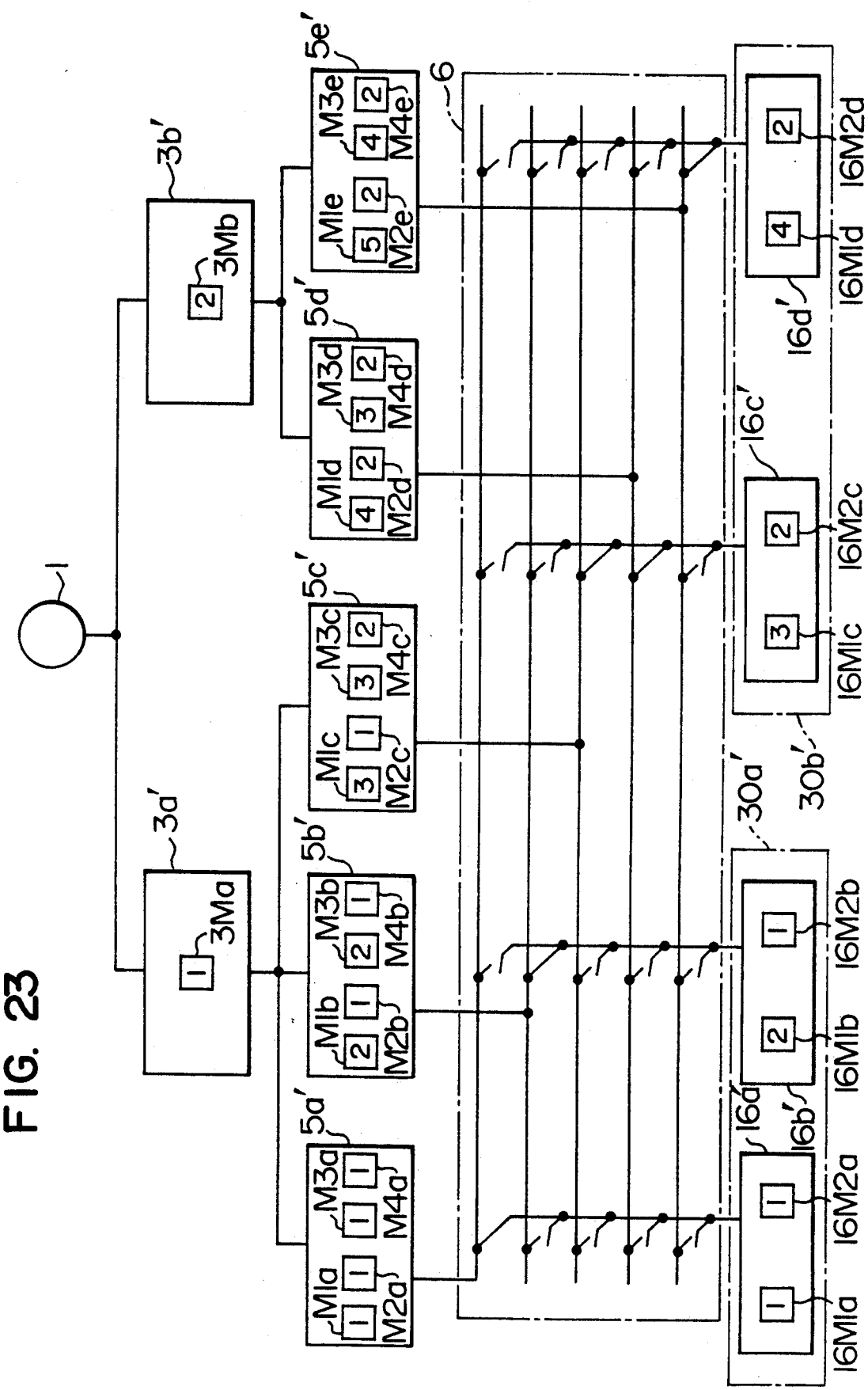
FIG. 23 shows another embodiment of the present invention comprising power converters having apparatus codes.

FIG. 23 shows another embodiment in which each power converter is equipped with an apparatus code. As specific contents of apparatus codes, let us consider an apparatus identification number for discriminating one apparatus from another, a power distribution apparatus identification number for determining a power distribution apparatus in connection, a connected load identification number for determining a load connected, and a load attribute identification number for determining the type of load. In FIG. 23, power distribution apparatuses 3a', 3b' are provided for supplying power to the power converters 5a' to 5e', and to the loads 16a' to 16d'. The loads 16a' and 16b' up a load group 30a', and the loads 16c', 16d' a load group 30b'. The two power distribution apparatuses are designated respectively by power distribution apparatus numbers 1 and 2 which are stored in memory means 3Ma and 3Mb respectively. The loads have the load identification numbers 1 to 4 thereof stored in the memory means 16M1a to 16M1d, and the load attribute identification numbers thereof stored in the memory means 16M2a to 16M2d. Loads having the same load attribute identification number demand the same form of power. The power converters 5a' to 5e' include memory means M1a to M1e for storing the power converter identification numbers, memories M2a to M2e for storing power distribution apparatus identification numbers, memory means M3a to M3e for connected load identification numbers, and memory means M4a to M4e for storing load attribute identification numbers respectively. The power converters 5a' to 5e' are designated by power converter apparatus identification numbers 1 to 5 respectively. Each power converter derives a power distribution apparatus number through the host computer 9 from a communication line on the one hand, and the load identification numbers and the load attribute identification numbers of the loads connected by control means such as circuit switching control means 8 shown in FIG. 1 controlling the conditions of the circuit switching means 6, on the other. As a result, in FIG. 23, the power converters 5a' to 5e' have apparatus codes 1111, 2121, 3132, 4232 and 5242 respectively. The host computer 9 is provided in advance with a plurality of control programs corresponding to the load attribute identification numbers. When the load attribute identification numbers in the apparatus codes are changed, each power converter notices the necessity for changing the control function and demands through the communication line that the host computer 9 supplies a control program associated with new load attribute identification numbers after change. At the same time, the host computer 9 transfers a required control program in compliance with the demand from the power converter. A control program may also be supplied from another power converter holding a required control program. In such a case, too, the presence of a control program may be noticed by searching the apparatus codes of the other power converters.

As explained above, the use of an apparatus code permits a flexible change in control functions, control characteristics, control conditions, etc. of the power converters in accordance with the load demands.

Figure 24:
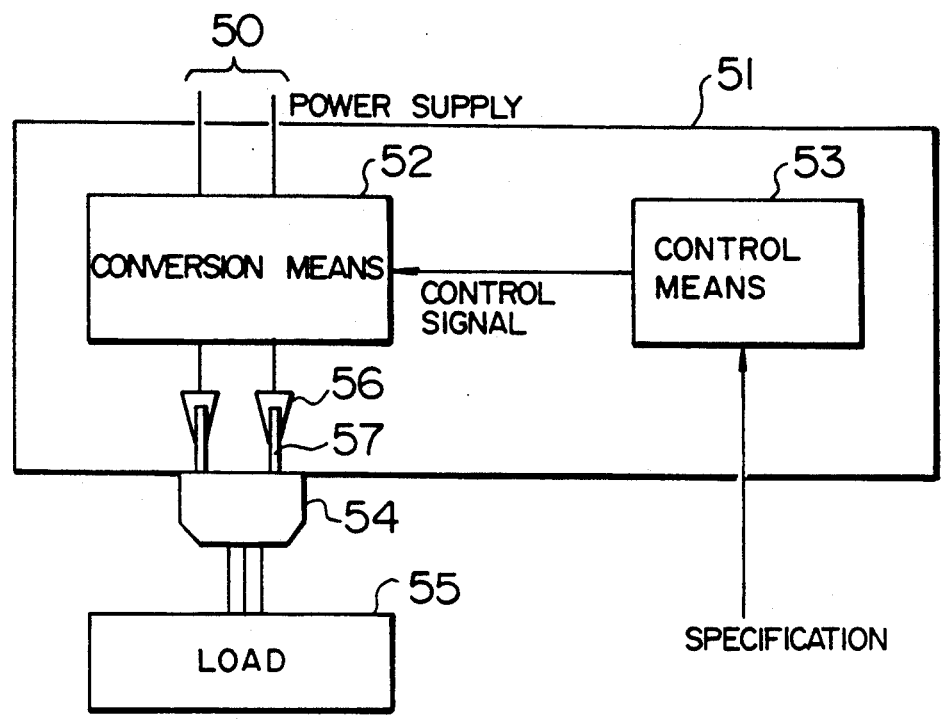
FIGS. 24 to 30 show first to seventh embodiments of another aspect of the present invention.

A small-power supply control system according to another aspect of the present invention will be explained below with reference to FIG. 24. In FIG. 24, numeral 51 designates a socket having the function of power conversion according to the present invention. The socket 51 is supplied with electric power from power supply line 50, and includes conversion means 52 and control means 53. The conversion means 52 is connected to a power supply and has an output terminal 56 for supplying power to a load 55. The output terminal 56 is connected to the electrode 57 of the plug 54 making up an input terminal to the load 55 by a contact between the electrode 57 of the plug 54 and the output terminal 56, the contact being replaceable like that of conventional sockets.

The primary feature of the socket having the power conversion function according to the present invention lies in the fact that the power specification "SP" required by the load 55 is applied to the control means 53 from outside of the socket. As another feature, the control means 53 controls the conversion means 52 in such a manner as to keep the output of the conversion means 52 to the setting of the specification. As compared with the conventional sockets in which the received commercial power is directly supplied to a load, the socket having the power conversion function according to the present invention is adapted to supply a commercial power converted into a specification desired by the load.

According to the present invention, power may be supplied to a plurality of loads having different power specifications, thereby improving the load efficiency.

Figure 25:
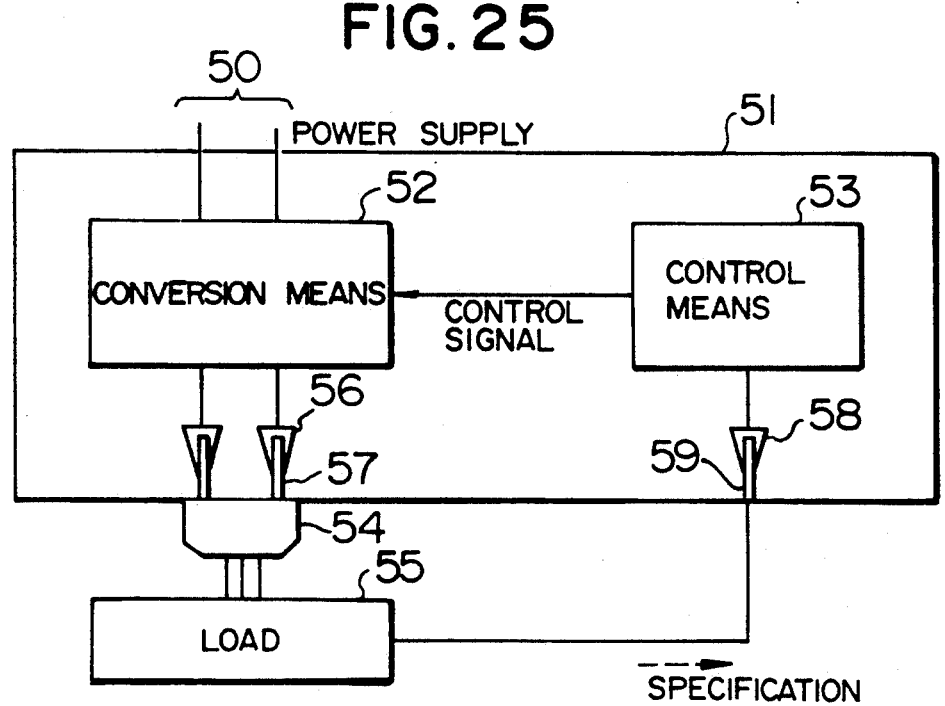

Another embodiment of the present invention is shown in FIG. 25. In FIG. 25, a socket with the power conversion function designated by numeral 51 includes conversion means 52 supplied with electric power from power supply lines 50, control means 53 and an output terminal 56 like the embodiment shown in FIG. 24. The feature of this embodiment resides in a specification input terminal 58 and the fact that a specification of the power desired by the load is transmitted from the specification output terminal 59 on the load 55. According to this embodiment, an instruction on the power value desired by a load is applied from the load 55 through the terminals 58 and 59. The terminal 59 may be special signal output means or may be used as or to replace the electrode 57 of the plug 54 for receiving power.

According to the present invention, transmission of power specification required by a load therefrom eliminates otherwise complicated operations by the user.

Figure 26:
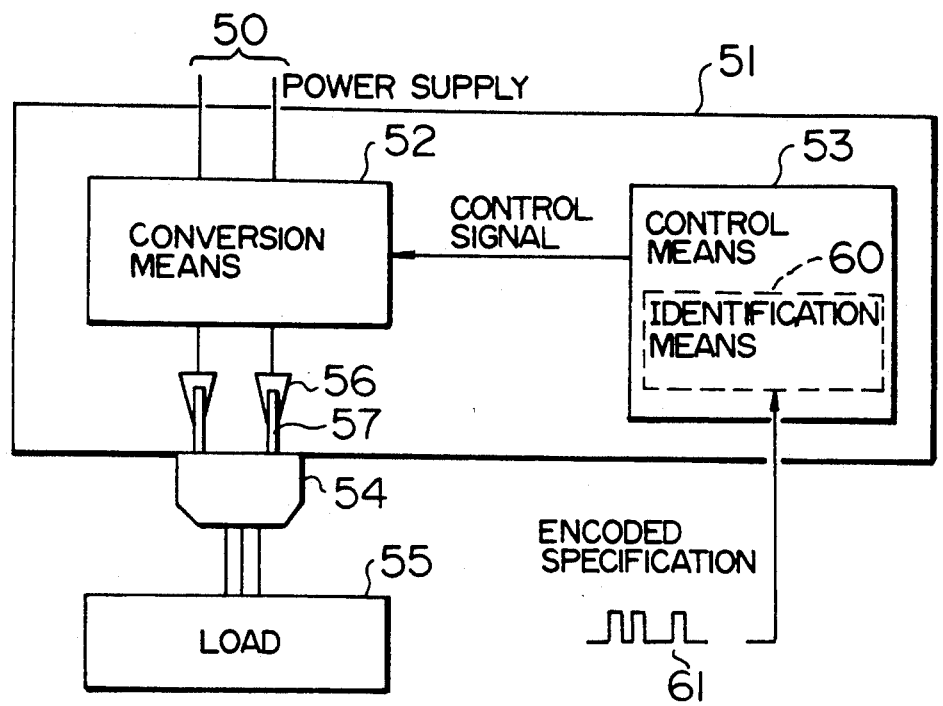

According to another embodiment shown in FIG. 26, the power specification desired by the load 55 is encoded and applied to control means 53. The circuit of FIG. 26 is different from the embodiment shown in FIG. 24 in that the control means 53 includes identification means 60 for decoding the encoded specification 61. The identification means 60 is for identifying the power specification desired by the load 55 by decoding the above-mentioned encoded specification 61 according to a predetermined rule. The encoded specification 61 may be applied to the socket 51 having the power conversion function by use of the terminals 58 and 59 as shown in the embodiment of FIG. 25.

If the specification is encoded as in the present invention, the noise which may be generated at the time of connecting a socket with a plug may be distinguished from the specification, thus improving the reliability.

Figure 27:
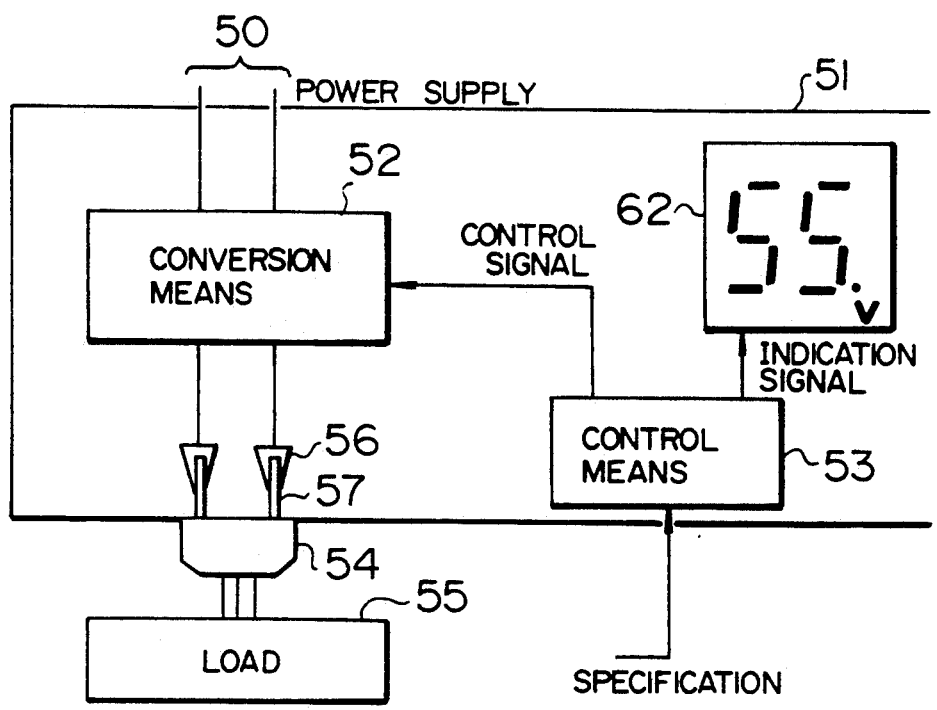

FIG. 27 shows another embodiment of the present invention. The feature of this embodiment lies in the indication means 62 added to the configuration of the socket 51 having the power conversion function shown in the embodiment of FIG. 24. The indication means 62, mounted on the surface of the body of the socket 51 having the power conversion function, is operated for indication in response to an indication command signal from the control means 53. The indication means 62 may indicate a voltage value desired by the load 55 in a numerical figure as shown in the embodiment of FIG. 27 or by a plurality of illumination means on the surface of the socket body.

If an indication means is provided according to the present invention, the operator may confirm that the desired power specification has been read correctly, thereby contributing to an improved maintainability Further, since the operator is in a position to know the present output conditions of the socket, it is possible to prevent a plug from being inserted into a power supply socket of a different output even in the case where the load is not equipped with any means for transmitting a signal to the conversion means.

Figure 28:
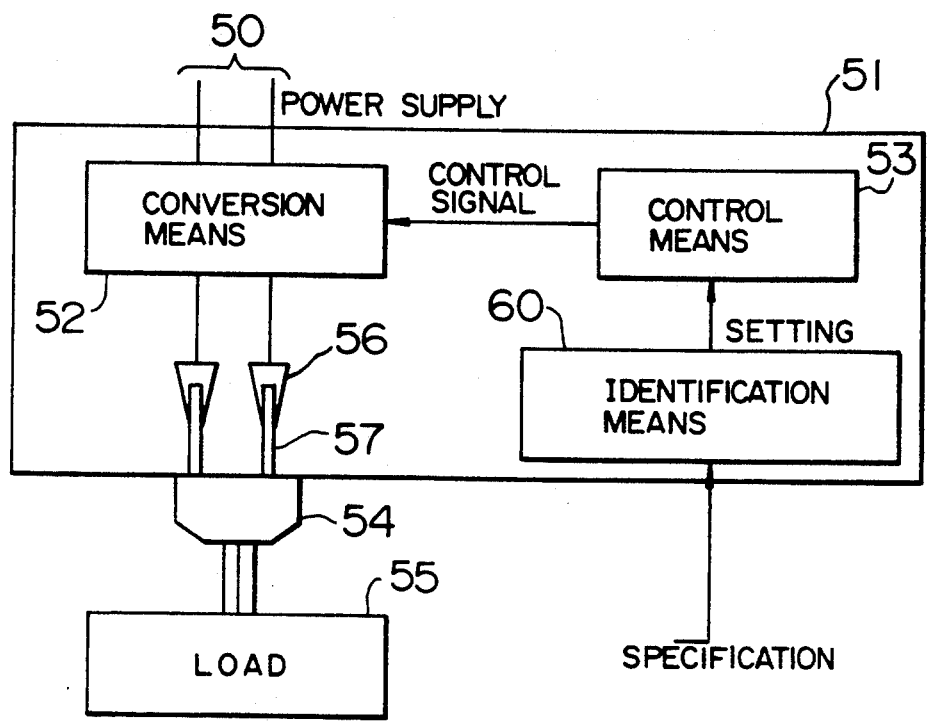

Still another embodiment of the present invention shown in FIG. 28 has a feature in identification means 60 provided separately from the control means for reading the power specification desired by the load. The identification means 60 reads the specification and transmits the value thereof as a setting to the control means 53. The control means 53 and the conversion means 52 after being supplied with the setting are operated in the same manner as in the embodiment shown in FIG. 24. According to the present invention, if the control means is configured of integrated circuits, then sensor means or the like that cannot be produced by the IC process may be provided independently as an identification means to facilitate production.

Figure 29:
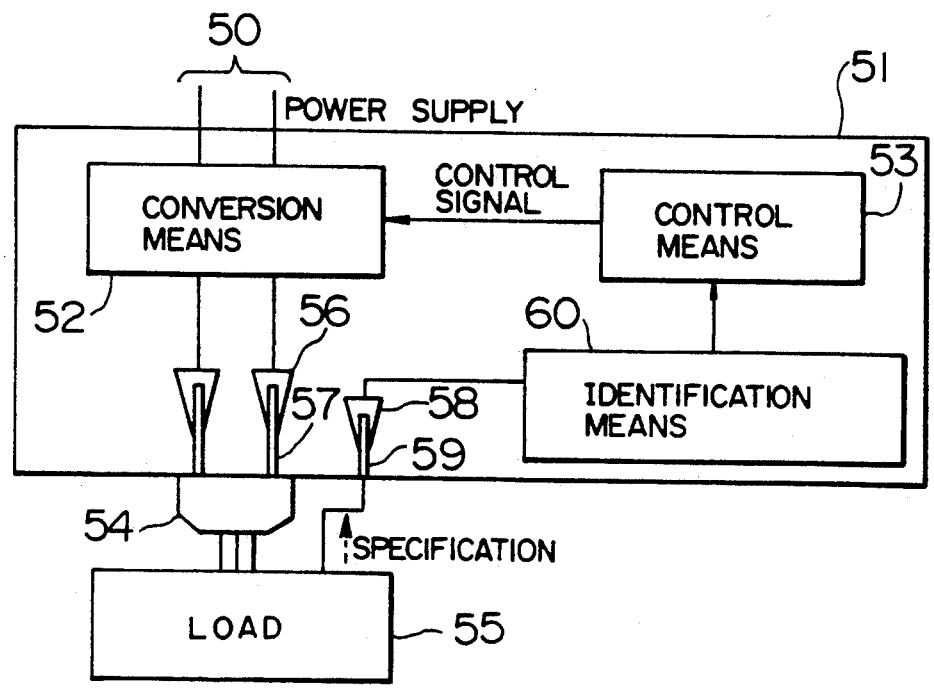

Also, the embodiment shown in FIG. 29, like the one shown in FIG. 25, has a specification input terminal 58 and is supplied with a power specification desired by the load 55 from the terminal 59. The present embodiment has the feature in that a power command value desired by the load 55 is transmitted through terminals 58 and 59 to the identification means 60. The function of the identification means 60, which is similar to that in the embodiment of FIG. 28, will not be described again.

According to the present invention, like in the embodiment shown in FIG. 25, the user is released from complicated operations and the productivity is improved as in the embodiment of FIG. 28.

Figure 30:
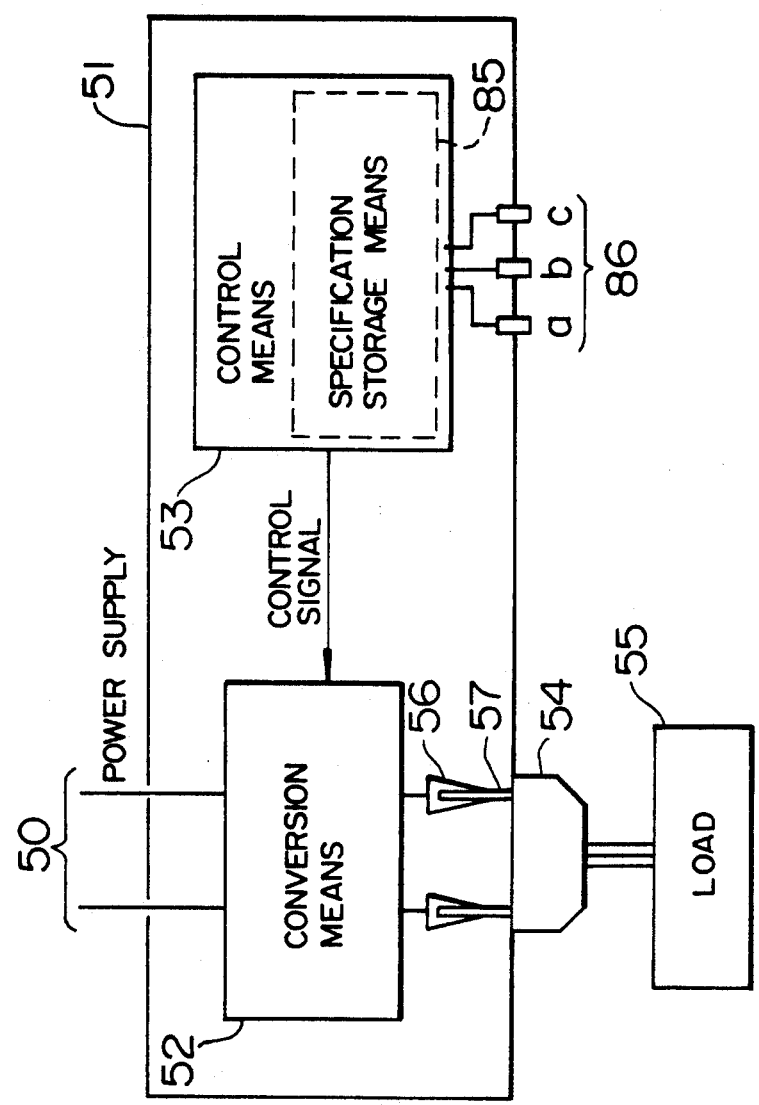

Unlike in the embodiment of FIG. 25 in which the power specification desired by the load 55 is supplied from the load 55, another embodiment of the present invention shown in FIG. 30 has the feature in that a plurality of power specifications are stored in memory means 85 in the control means 53 to enable the user to selectively turn on and off the switch means 86 to supply power of a proper specification to a load from a socket. In the case where there are only a few specifications of power supplied from the socket, the operation is simplified and a faulty operation prevented according to the present invention.

Figure 31:
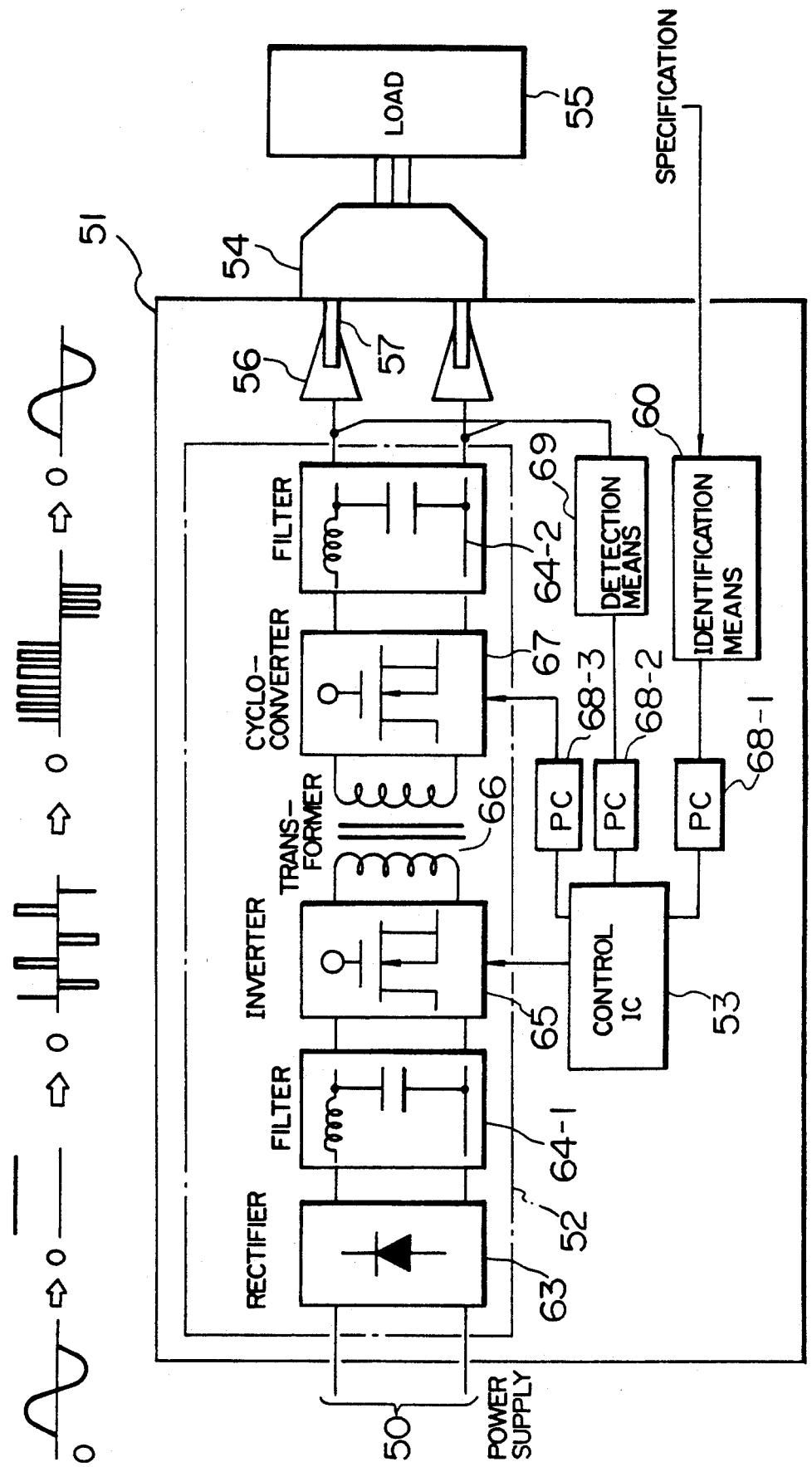
FIGS. 31 and 32 show eighth and ninth embodiments of the present invention, or more in particular first and second examples of power conversion means.

Another embodiment of the present invention shown in FIG. 31 represents an example of the conversion means 52. According to this embodiment, the voltage conversion means 52 is comprised of a rectifier 63 for receiving a commercial voltage, a filter 64-1, an inverter 65, a transformer 66, a cyclo-converter 67 and a filter 64-2. The output of the filter 64-2 is transmitted to detection means 69, and through a photocoupler 68-2, is applied to a control IC 53 making up control means. The control IC 53 produces a drive command to the inverter 65 and the cyclo-converter 67. According to the present embodiment, the control IC 53 is mounted on the primary side of the transformer 66, and a drive command to the cyclo-converter 67 on the secondary side of the transformer 66 is transmitted through a photocoupler 68-3. The configuration of the control IC 53 and the conversion means 52 described above is well known and is not directly related to the present invention. The identification means 60 to which a power specification desired by the load 55 is transmitted applies an output setting corresponding to the specification to the control IC 53. The present embodiment, however, has a feature in a photocoupler 68-1 interposed between the identification means 60 and the control IC 53. The object of this photocoupler 68-1 is to insulate and transmit a signal and may be replaced by other equivalent insulating means.

Now, the operation of the present embodiment will be explained. A source voltage applied to the socket 51 having a power conversion function is converted into a DC voltage by the rectifier 63 and the filter 54-1. The control IC 53 to which a setting is transmitted from the identification means 60 is for controlling the inverter 65 in PWM (pulse width modulation) fashion. Specifically, a DC voltage making up an output of the filter 64-1 is converted into an AC voltage in pulse form by the inverter 65 and is transmitted to the primary of the transformer 66. At the same time, the AC pulse voltage is transmitted while being insulated through the transformer 66 and applied to the cyclo-converter 67, which controls the polarity of the same pulse. Finally, the AC voltage is supplied to the load 55 from the output terminal 56 as a sinusoidal AC voltage. The detection means 69 detects the voltage value, frequency, etc. of the output applied to the load 55, which is transmitted to the control IC 53. The control IC 53 decides whether the detected voltage, current, frequency and the like are equal to the settings supplied from the identification means 60, and when they are not equal, changes the drive command for the inverter 65 and the cyclo-converter 67.

According to the present embodiment, an output of a given voltage is produced by controlling the inverter 65, and thus it is possible to realize the function of supplying a power specification required of a load making up a feature of the present invention. Another feature of the present embodiment resides in that the frequency of an output voltage is also changeable by controlling the cyclo-converter 67, so that a frequency of a specification desired by the load may be supplied together with a voltage.

According to the present invention, not only the voltage and current but also the frequency may be set to a value desired by the load, thus improving the load efficiency and reducing the load size by high-frequency power feeding.

Figure 32:
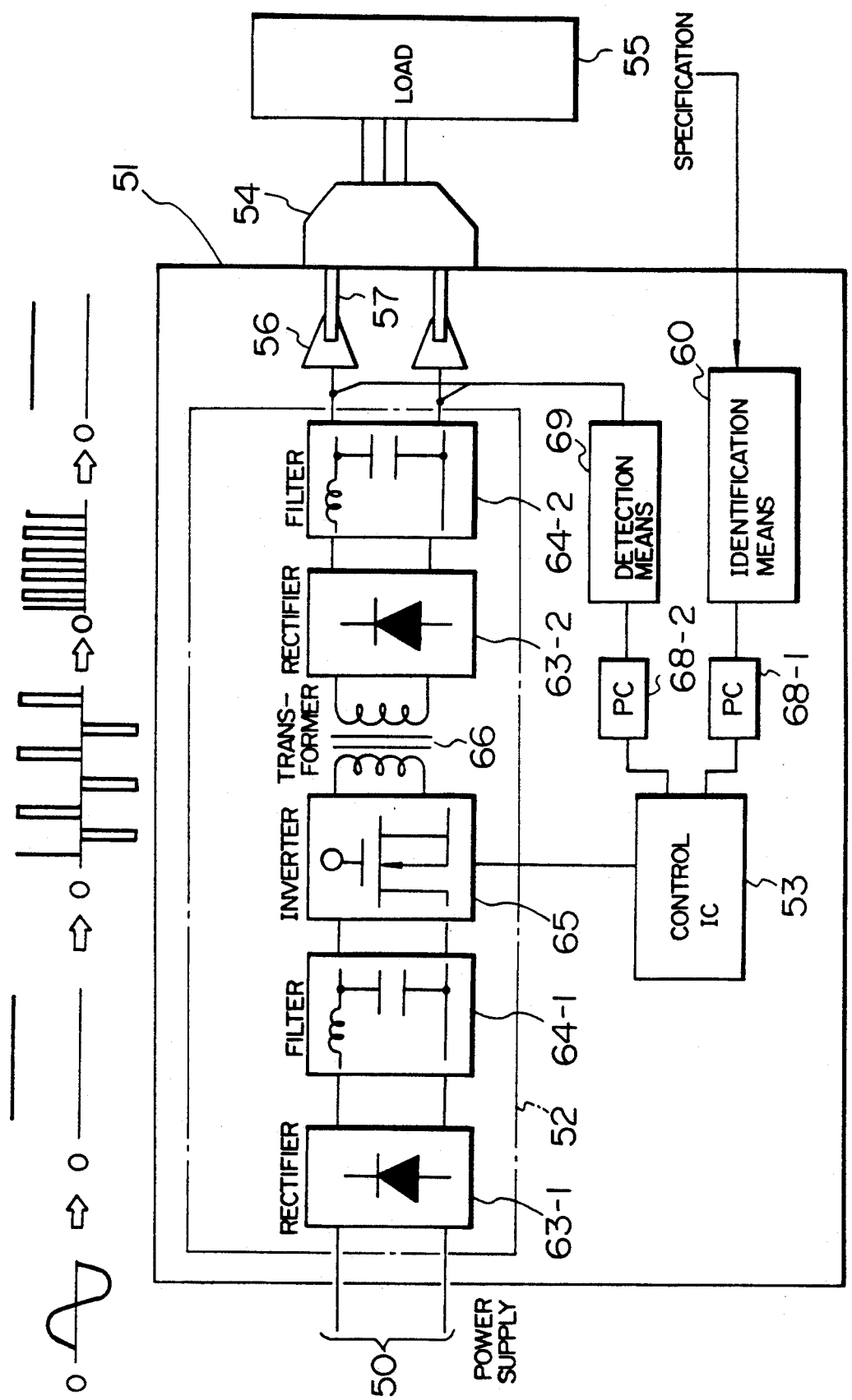

Now, still another embodiment of the present invention shown in FIG. 32 provides another form embodying the conversion means 52. In this embodiment, the conversion means 52 includes a rectifier 63-1 for receiving a commercial voltage, a filter 64-1, an inverter 65, a transformer 66, a rectifier 63-2 and a filter 64-2. The output of a filter 64-2 is transmitted to the detection means 69, and through a photocoupler 68-2, is applied to the IC 53 making up control means as in the embodiment of FIG. 31. The control IC 53 produces a drive command to the inverter 65. The control IC 53, as in the embodiment of FIG. 31, is mounted on the primary side of the transformer 66 in this embodiment. The configuration of the control IC 53 and the conversion means 52 is well known as that of a switching power supply, and is not directly related to the present invention. The identification means 60, as in the embodiment of FIG. 31, transmits a power specification desired by the load 55 to the control IC 53 as a setting. According to the present embodiment, a photocoupler 68-1 is inserted between the identification means 60 and the control IC 53. As in the embodiment of FIG. 31, the object of the photocoupler 68-1 is to transmit a signal in insulated state and may be replaced by other equivalent insulating means. Now, the operation of the present embodiment will be explained. A voltage applied to the socket 51 having the function of power conversion is converted into a DC voltage by the rectifier 63-1 and the filter 64-1. The control IC 53, supplied with a setting from the identification means 60, subjects the inverter 65 to PWM control. A DC voltage making up an output of the filter 64-1 is converted into an AC voltage in pulse form by the inverter 65, and transmitted to the primary of the transformer 66. At the same time, the AC voltage in pulse form is transmitted in insulated state through the transformer 66, and a DC voltage is produced by way of the rectifier 63-2 and the output-smoothing filter 64-2. The fact that the voltage applied to the load 55 is direct current is the feature of the present embodiment. The control IC 53 decides whether the voltage detected by the detection means 69 is equal to the setting supplied from the identification means 60, and if it is not equal, the drive command to the inverter 65 is changed.

According to the present embodiment, it is possible to realize the function of producing the power of a specification desired by the load as a feature of the present invention.

For many loads, an AC voltage, after being received, is rectified and smoothed before being applied to the loads. According to the present invention, however, such rectification and smoothing means are not required to be incorporated in the load and therefore the load is reduced in size.

The embodiments of FIGS. 31 and 32 permit realization of a function of supplying the power of a specification desired by the load as a feature of the present invention. The configuration of the voltage conversion means in the embodiments of FIGS. 31 and 32 is well known. The feature of the socket 51 having the function of power conversion according to the present invention is the provision of the conversion means 52 having a transformer 66 making up an insulation means interposed between a commercial voltage received and an output voltage supplied to the load.

Another feature of the embodiments shown in FIGS. 31 and 32 is that the voltage received by the socket 51 is converted into a form of power corresponding to the load specification after being rectified. In FIGS. 31 and 32, the inverter 65 is subjected to a constant voltage control in accordance with the load specification, although a constant-current control may realize a conversion means for producing a current desired by the load.

Figure 33:
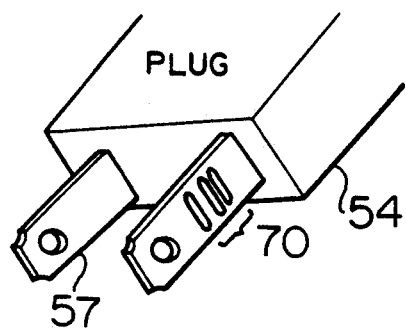
FIGS. 33 and 35 are diagrams showing first and second embodiments of a plug having the function of information transmission.
Figure 34:
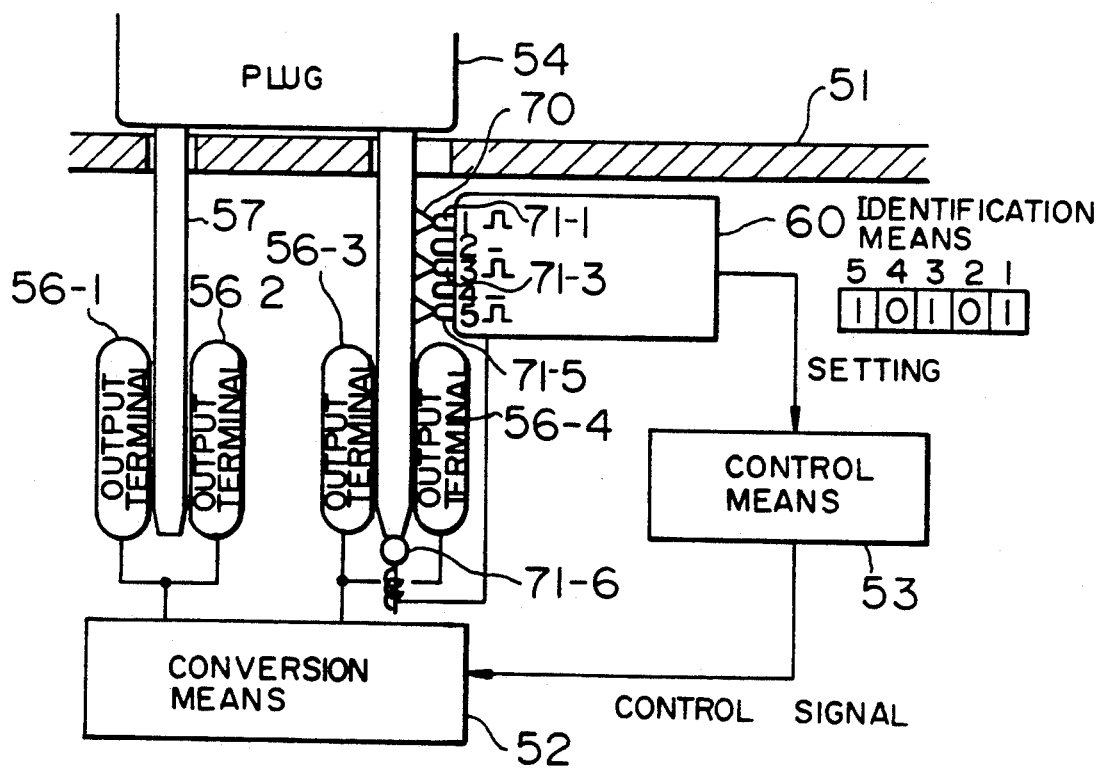
FIGS. 34, 36 and 37 show further embodiments of the present invention relating to identification means.

The embodiment shown in FIGS. 33 and 34, on the other hand, represents an identification means for a socket having the power conversion function and a plug having the information transmission function as a specific form of the present invention.

First, FIG. 33 shows the plug 54 for the load 55 in the embodiments of FIGS. 24 to 32. The feature of this embodiment lies in that an electrode 57 corresponding to the input terminal of the plug 4 is provided with a code 70 representing a power specification desired by the load 55. This embodiment has a plurality of protruded stripes on the surface of the electrode 57, and the number of the stripes corresponds to a code representing the power specification desired by the load 55. This code is read by a configuration shown in FIG. 34.

FIG. 34 is a sectional view of the plug 54 shown in FIG. 33 being inserted into the socket 51 having the power conversion function according to the present invention.

In the embodiment of FIG. 34, the conversion means 52 in the socket 51 is for supplying power to the load 55 from the output terminals 56-1, 56-2, 56-3 and 56-4 as in the aforementioned embodiment. The embodiment shown in FIG. 34 is so configured that the above-mentioned output terminals are in contact and electrically connected with the electrode 57 of the plug 54 shown in the embodiment of FIG. 33. The protrusions 70 representing a code on one side of the electrode 57 of the plug 54 are in contact with a plurality of terminals 71 of the identification means 60. The terminals 71 are constructed to be movable in the longitudinal direction by expansion means such as a spring (not shown), and after the plug 54 is inserted into the socket 51, become ready to contact the protrusions 70. Also, the electrode 57 of the plug 54 in close contact with the output terminals 56-1, 56-2, 56-3 and 56-4 brings the forward end of the electrode 57 into contact with the terminal 71-6 connected to the identification means 60. As a result, the conductors of the terminal 71-6, the electrode 57 of the plug 54, the protrusions 70 and the terminals 71 are connected in series. In FIG. 34, assume, for example, that the identification means 60 has five terminals 71 of which terminals 71-1, 71-3 and 71-5 are in contact with the protrusions 70. Because of the series connection of the conductors mentioned above, the terminals 71-1, 71-3 and 71-5 in contact with the protrusions 70 apply a high-level signal to the identification means 60, while the terminals 71-2 and 71-4 out of contact with the protrusions 70 are open, thus applying a low-level signal to the identification means 60.

The identification means 60 constructs a five-bit information as shown in FIG. 34 on the basis of a signal supplied from the terminals 71. This information corresponds to the specification desired by the load 55 and is transmitted as a setting to the control means 53. The function of the control means 53 after receiving this setting is similar to the one described in the embodiments of FIGS. 31 and 32.

As described above, the present embodiment is characterized by the function of reading an encoded specification formed on the surface of the electrodes 57 of the plug 54. In FIG. 33, the specification may be encoded in the form of slots in place of protrusions as in the present embodiment, or other means such as a plurality of holes. The above-mentioned technique of reading a code may also be replaced by another equivalent means.

According to the present invention, a plug electrode is used for information transmission and provides a low-cost means of information transmission.

Figure 35:
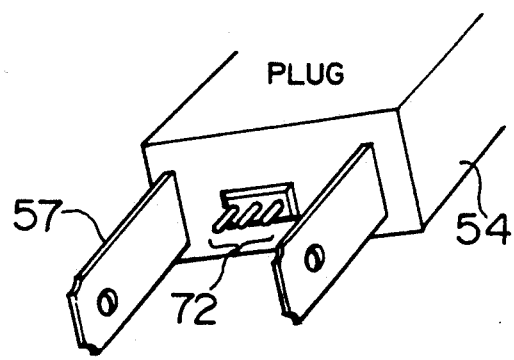
Figure 36:
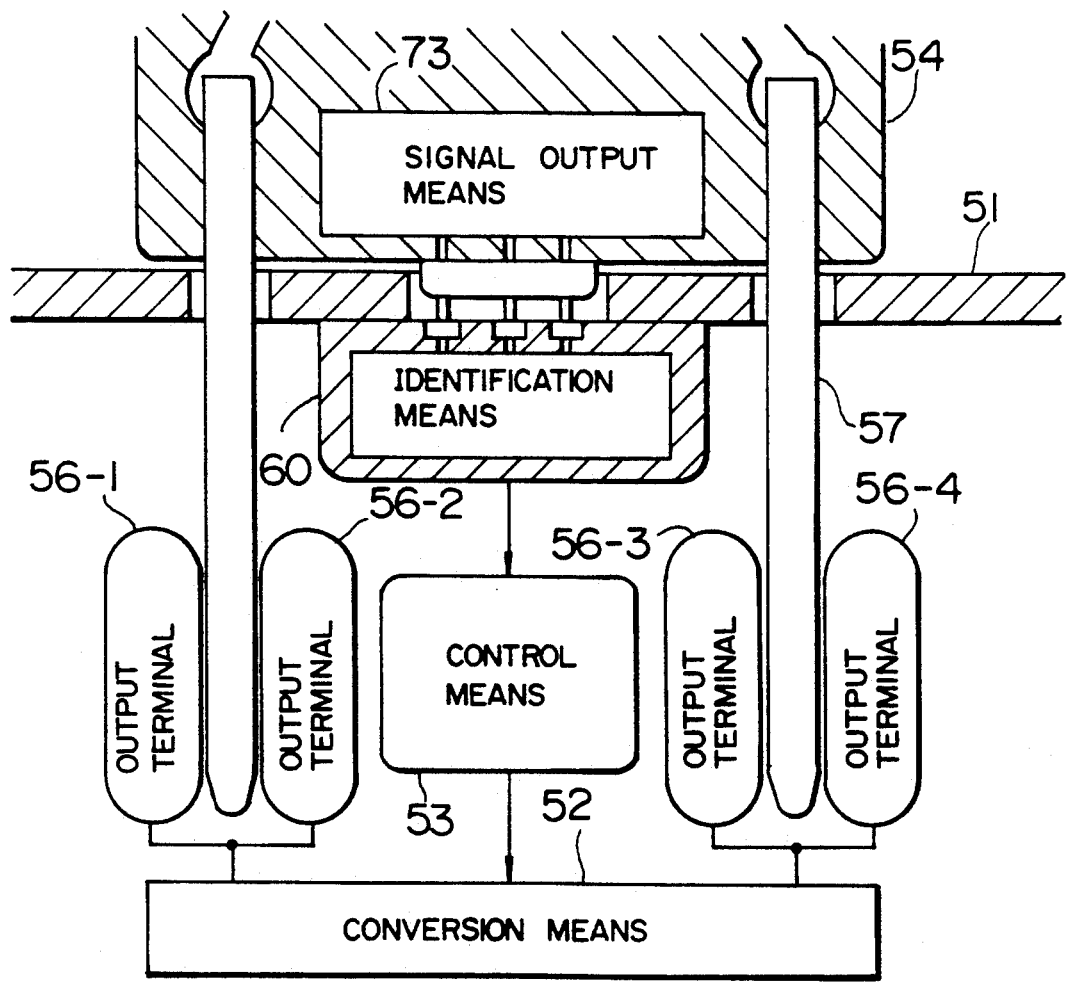

Apart from the embodiment shown in FIG. 33 characterized by a code corresponding to a specification formed on the surface of the electrode 57 providing an input terminal of the plug 54 with the code-reading function attached to the socket 51 having the power conversion function according to the present invention, another embodiment shown in FIG. 35 has the feature in that the plug 54 of the load has signal output terminals 72 different from the electrodes 57 of the input terminal. FIG. 36 shows an embodiment of the plug 54 having the signal output terminals 72 and the socket 51 having the power conversion function and also the function of reading a signal from the terminals 72. In the embodiment of FIG. 36, the plug 54 includes signal output means 73 connected to the signal output terminals 72. The socket 51 having the power conversion function also includes identification means 60 having a function similar to the one shown FIGS. 28 to 32. FIG. 36 is a sectional view showing the plug 54 and the socket 51 connected with each other. With the electrodes 57 of the plug 54 connected to the output terminals 56-1, 56-2, 56-3 and 56-4 in the socket, the signal output means 73 and the identification means 60 are connected with each other through the terminals 72, so that a power specification demanded by the load is transmitted from the signal output means 73 to the identification means 60. The identification means 60 in this embodiment is similar to those included in the embodiments shown in FIGS. 28 to 32, and a specification transmitted thereto is applied as a setting to the control means 53. On the basis of this setting, the control means 53 controls the voltage conversion means 52 to supply a voltage to the load 55 as desired thereby.

According to the present invention, the signal output means 73 may use an IC memory or the like, so that the information transmitted to the socket is increased thereby to make possible a more appropriate power supply.

It is also possible for the identification means 60 to determine the load specification by the arrangement of the terminals 72. In such a case, the power for signal output means 73 is eliminated from the plug, and normal commercial power may also be supplied when a conventional plug is inserted into the socket.

Figure 37:
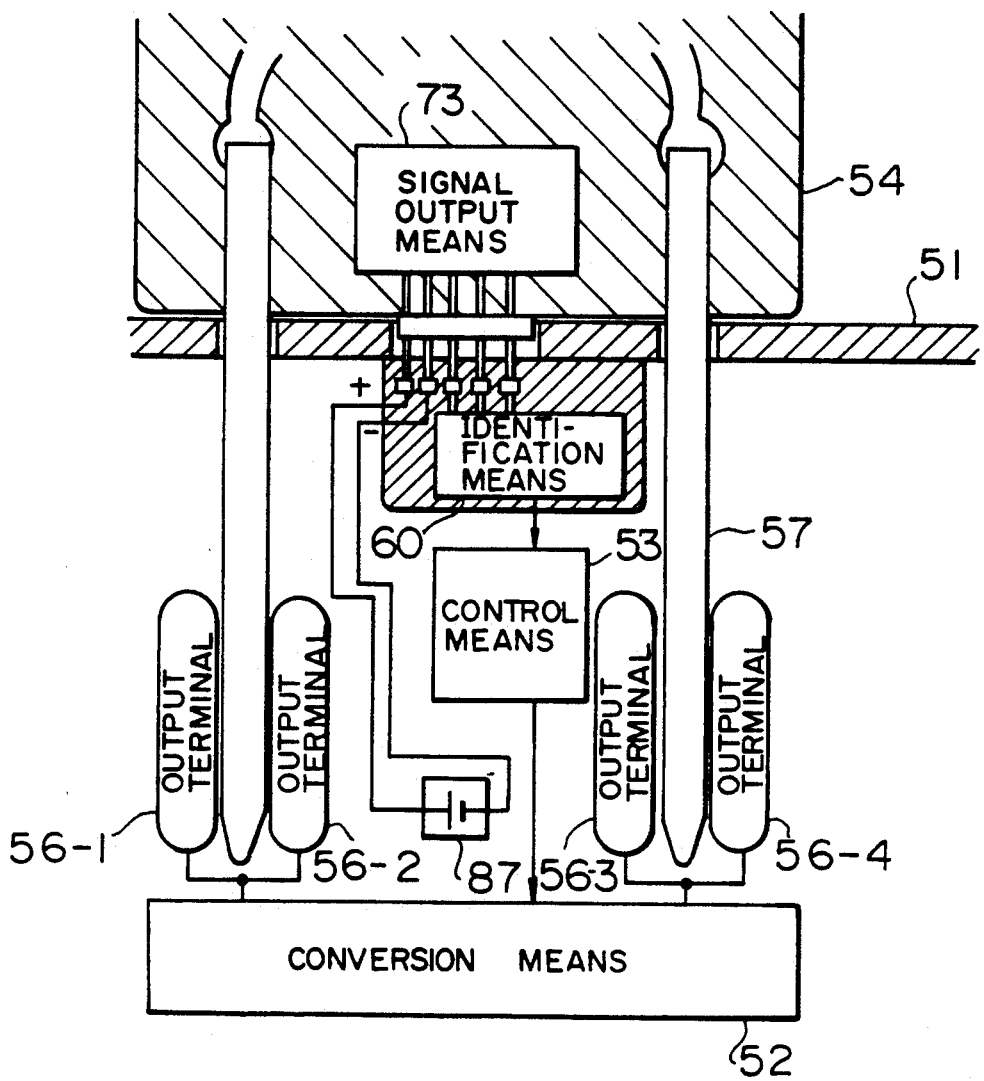

In the case where an IC memory is used as the signal output means 73 in the embodiment shown in FIG. 36, a power supply is required for energizing the IC. Still another embodiment shown in FIG. 37 has the feature in that power is supplied from a socket having the power conversion function. Specifically, as shown in FIG. 37, a power supply 87 is incorporated in the socket 51 to supply power for energizing the signal output means 73. The power supply 87 may be provided as an independent function in the socket 51 or may be derived from the output of the conversion means 52.

According to the present invention, beside the original power supplied from a socket to a load, power may be supplied to the signal output means 73, thus improving the reliability of the function of transmitting a power specification desired by the load.

Figure 38:
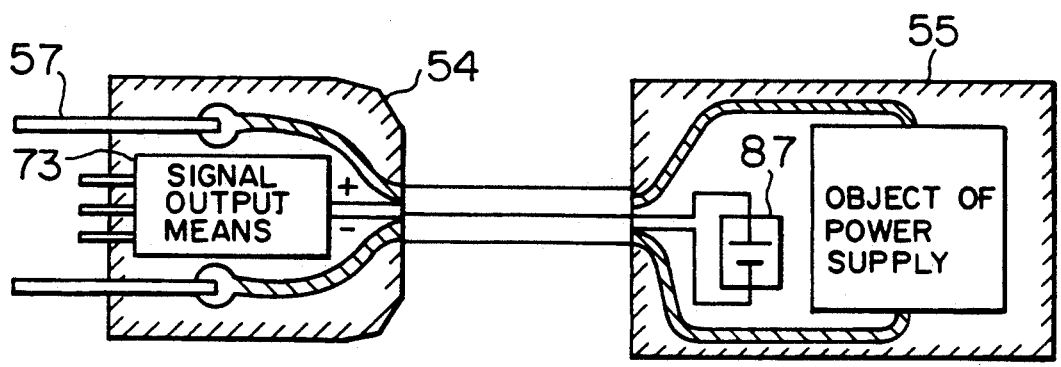
FIG. 38 shows a still another embodiment of the present invention.

Unlike in the embodiment shown in FIG. 37 in which power for driving the signal output means 73 is supplied from the socket 51 having the power conversion function, the embodiment shown in FIG. 38 is characterized in that the driving power supply 87 is incorporated in the load 55.

According to this invention, a stable power supply not dependent on the output of the socket is provided for the signal output means 73, thereby improving the reliability.

Figure 39:
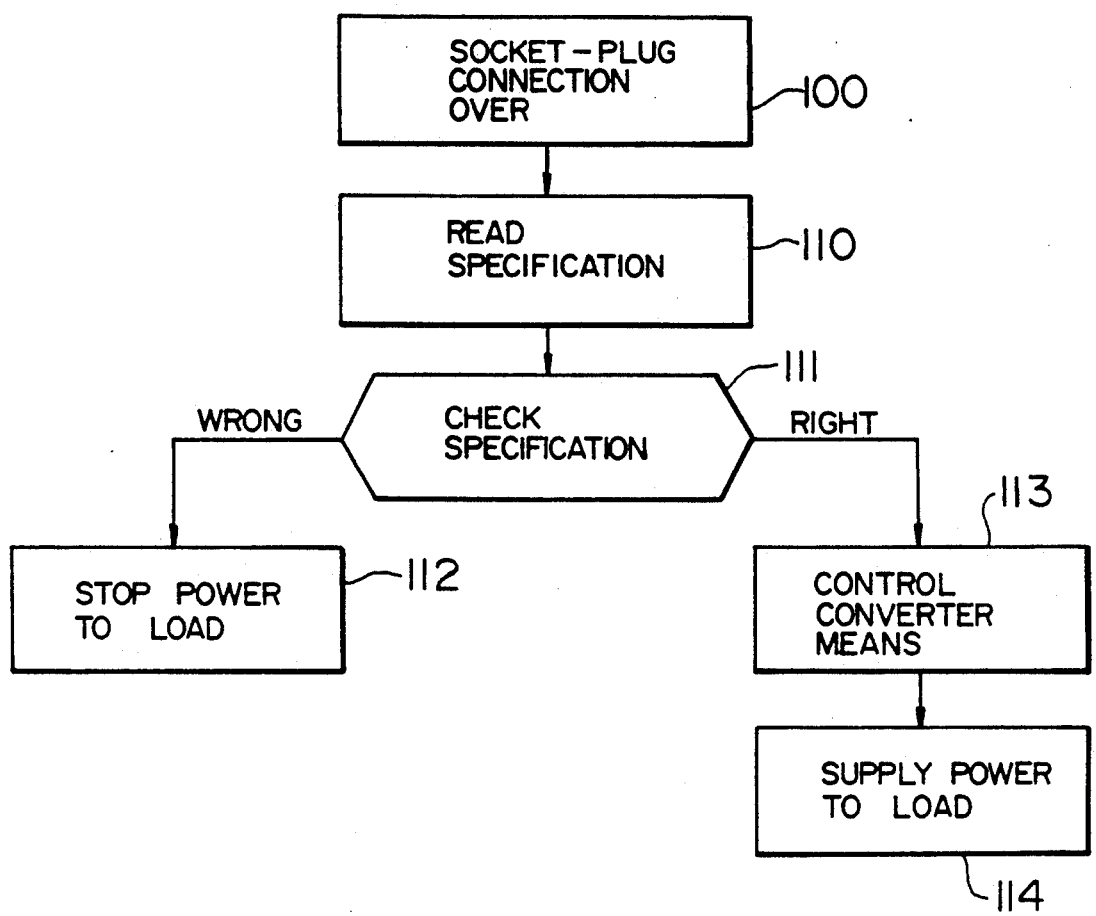
FIG. 39 is a flowchart showing the operation of a socket having the function of power conversion.

In FIG. 39, an embodiment relating to the flow of operation of a socket having the power conversion function according to the present invention is shown in the form of a flowchart. The flow of operation in this embodiment is applicable to the respective configurations of the embodiments shown in FIGS. 24 to 38 (except for FIGS. 33 and 35). Explanation here will be made, however, only about the flow of operation between the control means 53 and the conversion means 52 with reference to the embodiment shown in FIG. 24.

First, the socket 51 is connected with the load plug 54 by the user (100). After the output terminals 56 of the socket come into correct contact with the plug electrodes 57, the control means 53 reads a power specification desired by the load 55 (110). The control means 53 decides whether the specification read thereby has been transmitted correctly according to a predetermined rule (111), and if it is not so transmitted, or erroneously transmitted, power is not supplied to the load 55 (112). As long as the specification is correctly transmitted, by contrast, the control means 53 starts driving the conversion means 52 to control the output thereof in such a manner that the output of the conversion means 52 may take a specification value as commanded from the load 55 by the PWM control or other technique using the specification mentioned above as a setting (113). In this way, the desired power is supplied to the load 55 (114).

The operation of the embodiment shown in FIG. 39 has the feature in having the function of deciding whether the control means 53 is supplied correctly with a specification from the load 55. This function of decision improves the safety. More specifically, if a plug of different shape is connected and the specification on the plug electrodes 57 fails to be identified, or if a specification is applied as an erroneous value as a result of a faulty contact of the plug electrodes 57 and the output terminals 56 of the socket, then an application of an erroneous voltage, an erroneous current or an erroneous frequency to the load 55 would dangerously damage the load 55. The operation shown in FIG. 39, however, safely prevents power from being supplied to the load 55 in such a case. This decision function may be included either in the control means 53 as described above or in the identification means 60.

Figure 40:
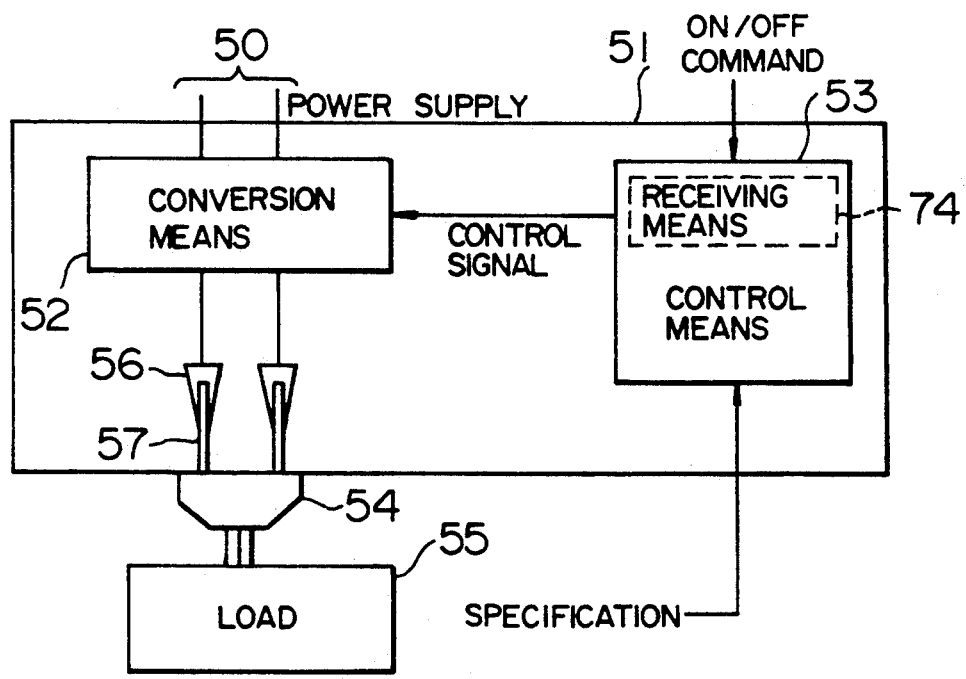
FIGS. 40 and 42 show further embodiments of the present invention.

Now, a further embodiment of the present invention is shown in FIG. 40. The feature of the embodiment of FIG. 40 lies in that the control means 53 of the socket 51 having the power conversion function shown in FIG. 24 includes receiving means 74 for receiving an on-off command from an external source. The configuration of this embodiment other than the on-off command receiving means 74 is similar to that of the embodiment shown in FIG. 24 and therefore will not be described any further. The operation of the embodiment shown in FIG. 40 will be explained with reference to FIG. 41.

Figure 41:
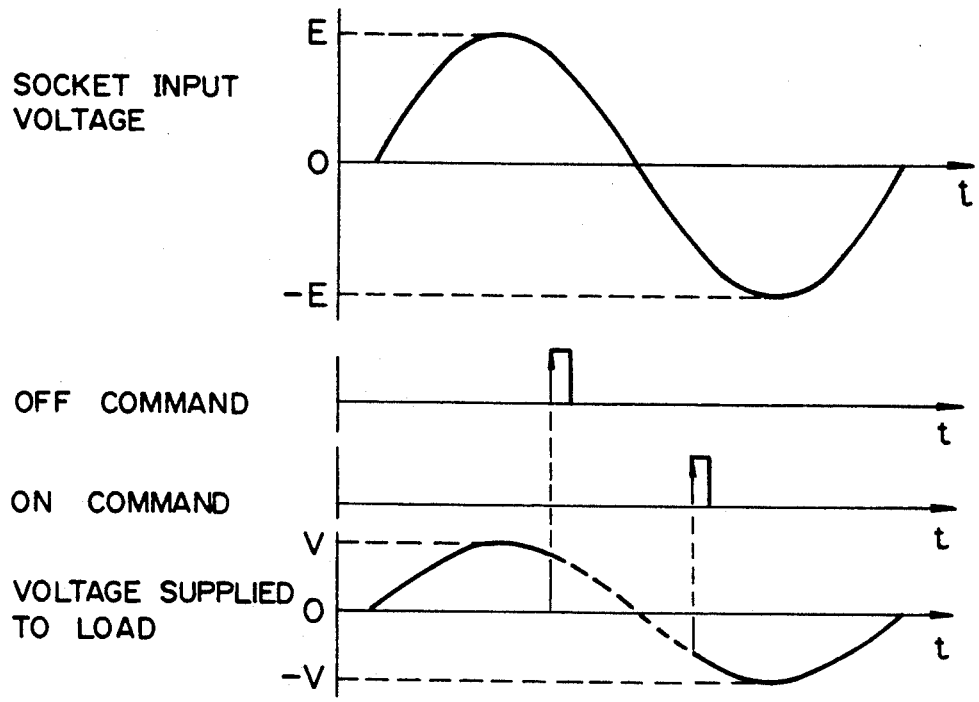
FIGS. 41 and 43 show waveform diagrams showing the respective operations of the embodiments shown in FIGS. 40 and 42.

FIG. 41 shows a voltage applied from a power supply to the socket 51, an on or off command supplied from an external source and voltage waveforms applied to the load 55. In FIG. 41, when an off command is applied as a high-level signal, the power supply to the load 55 is stopped and the output voltage is reduced to zero. When an on command is applied as a high-level signal, on the other hand, power restarts to be supplied to the load 55. In this way, the feature of the present embodiment lies in that power transmission to the load 55 is ceased or resumed by giving an on or off command from an external source.

According to the present invention, the socket 51 is provided with the function of a switch thereby to realize a high function.

Figure 42:
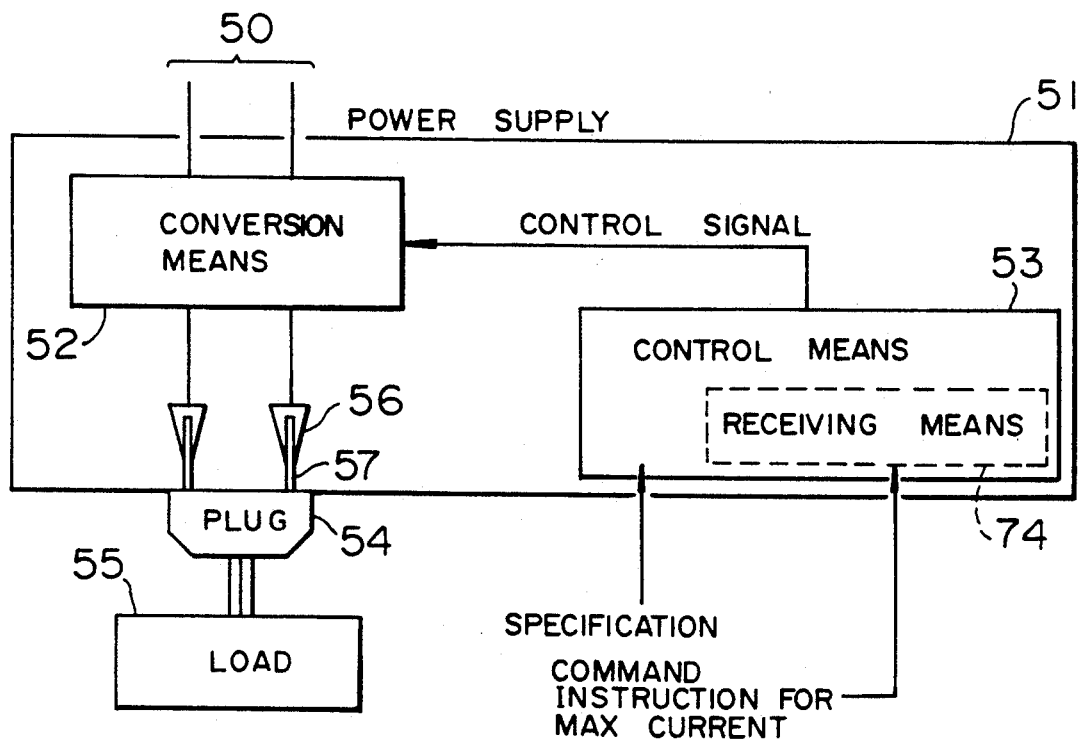

A still further embodiment shown in FIG. 42 is characterized in that the control means 53 of the socket 51 having the power conversion function shown in FIG. 24 further includes receiving means 74 for receiving a command representing a maximum value of the current supplied to the load 55. The parts of the configuration other than the receiving means are identical to those in FIG. 24 and therefore will not be described in detail. The operation of the embodiment shown in FIG. 42 will be explained with reference to FIG. 43.

Figure 43:
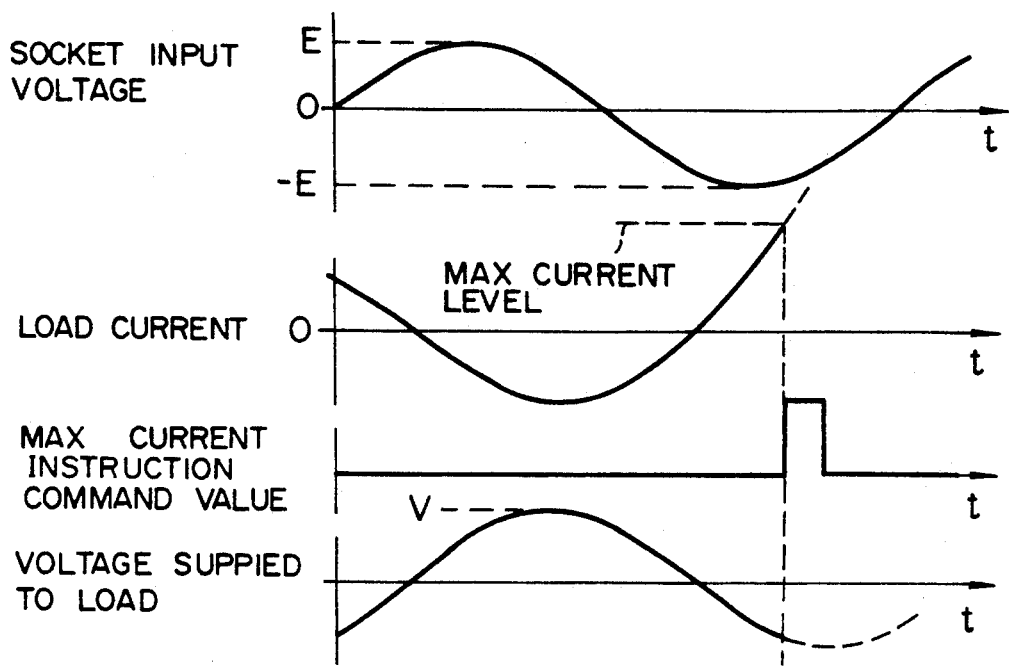

FIG. 43 shows a voltage applied from a power supply to the socket 51, a current applied to the load 55, a maximum current command value applied to the control means 53 from an external source, and voltage waveforms applied to the load 55. The maximum current command value may be transmitted from a given device instead of from the load 55 as in the present embodiment.

In FIG. 43, when the load current exceeds an allowable maximum current level, the load 55 transmits a maximum current command value to the control means 53. Upon application thereof of this command value, the control means 53 gives a command to the conversion means 52 to protect the load 55. Although there are various methods of performing the operation of protecting the load 55, the embodiment shown in FIG. 43 employs a method in which power supply to the load 55 is stopped to reduce the current and voltage applied to the load 5 to zero, as an example. The function of this embodiment protects the load 55 in case of short-circuiting thereof for an improved safety. A maximum current command value may be applied as a signal indicating the generation of a maximum signal as in the present embodiment or a maximum value of the current allowable for the load as a specification. Also, power supply to the load 55 may be stopped at the time of generation of a maximum current as in the present embodiment, or the current supplied to the load 55 may be held below an allowable value.

Figure 44:
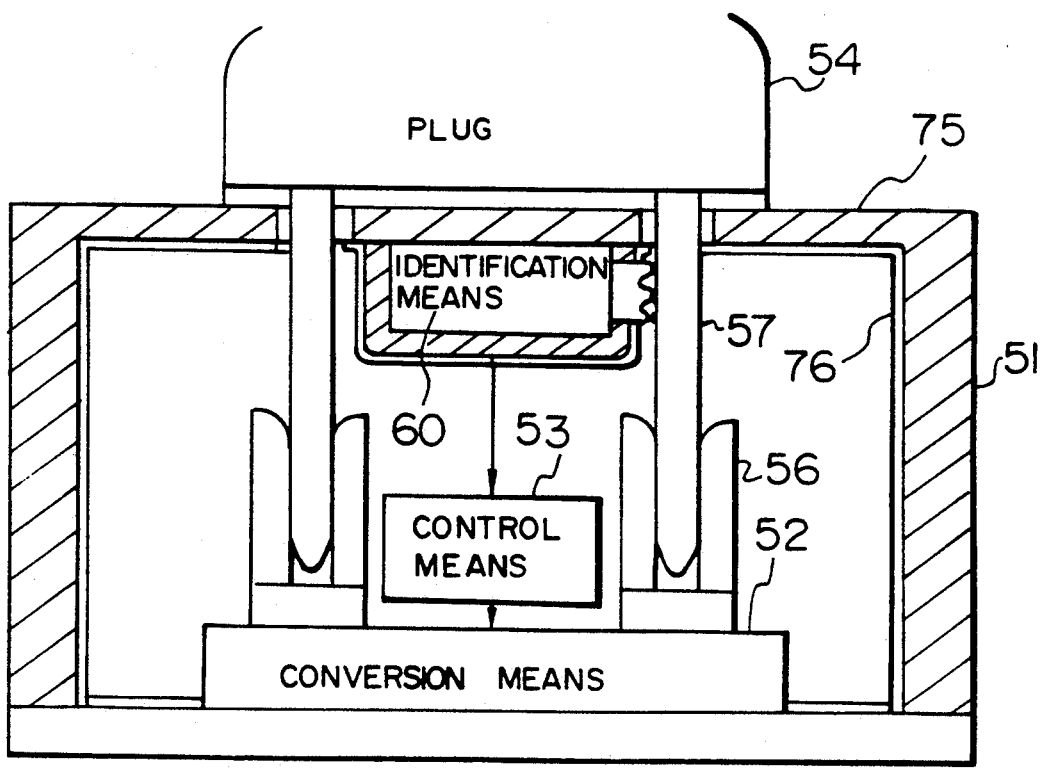
FIGS. 44 and 45 show further embodiments of a plug and socket according to the present invention.

The embodiment of FIG. 44 is shown as a sectional view of the socket 51 having the power conversion function according to the present invention. In this embodiment, the connector of the output 56 and the electrodes 57 of the plug 54, the conversion means 52, the control means 53 and the identification means 60 are covered by an electrically insulating member 75. The feature of the present embodiment resides in the fact that the identification means 60 is molded with an insulating material within the cover. In place of the identification means 60, it is also possible to mold the control means 53 or the conversion means 52 in the cover.

As described above, according to the present invention, the socket package is reduced in size.

Another feature of the present embodiment lies in a shield member 76 inserted in the cover for preventing noises caused in the conversion means 52 from leaking to the outside or external noises from entering the apparatus. The shield member may be inserted on the interior surface of the cover 75 as in the present embodiment or may be disposed on the exterior surface.

The present invention improves the apparatus reliability by preventing entrance or generation of noises.

Figure 45:
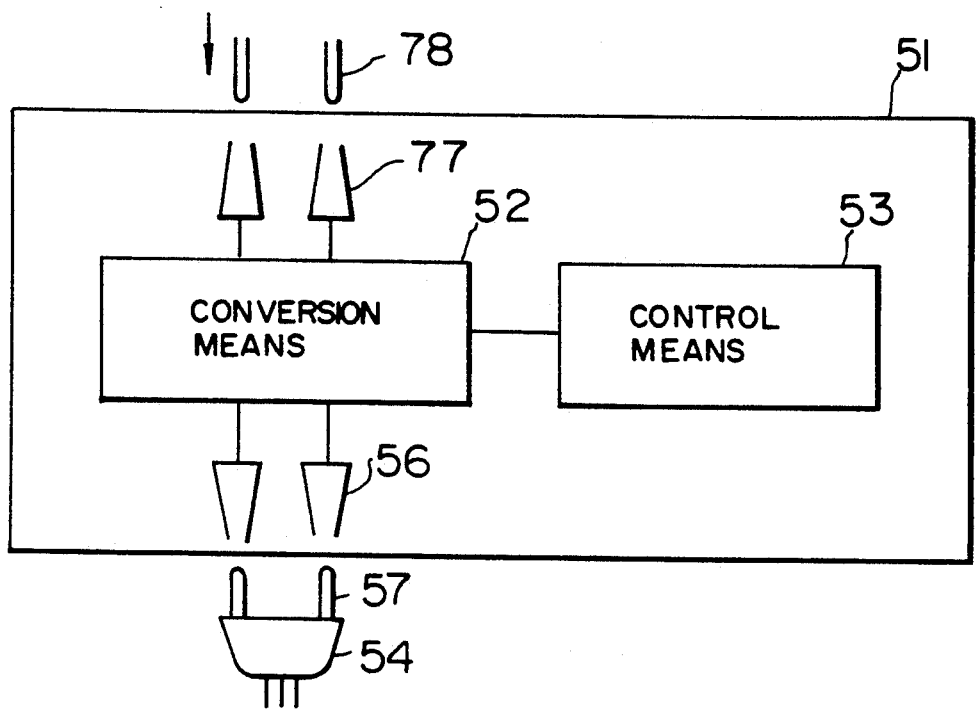

The embodiment shown in FIG. 45 has the feature in that the input terminals 77 of the conversion means 52 connected with a power supply and the power output terminals 78 are of a removable type. This configuration facilitates the relocation and transportation of the socket 51 having the power conversion function according to the present invention for a wider field of applications.

Figure 46:
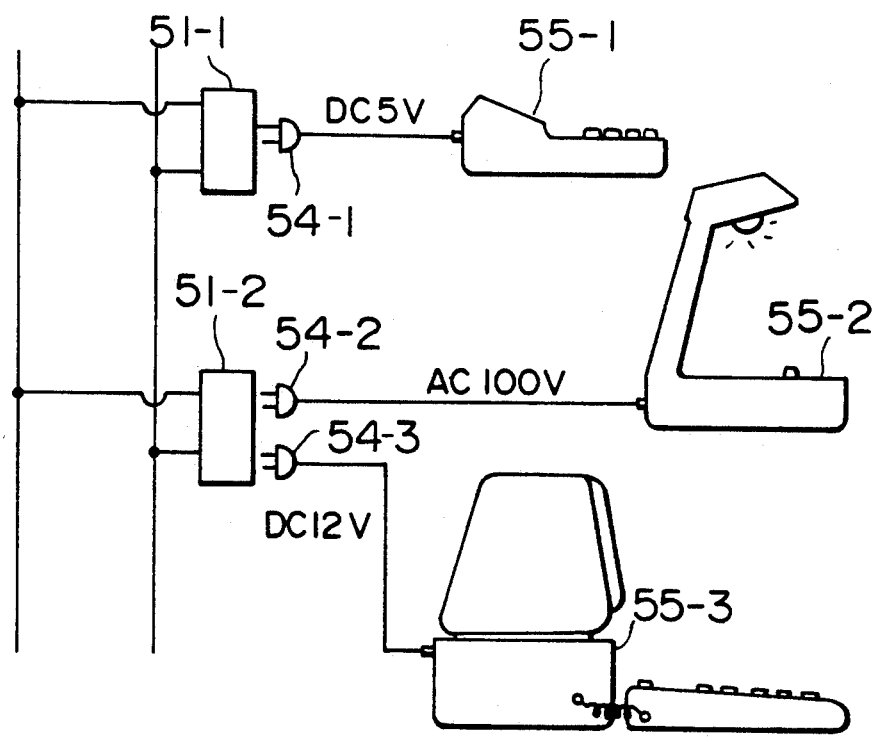
FIG. 46 shows a first embodiment relating to a system for supplying power to a load.

The embodiment shown in FIG. 46 represents a power feeding system for supplying different specifications of power to a plurality of loads 55-1, 55-2 and 55-3 from a common power supply by use of sockets 51-1 and 51-2 having the power conversion function according to the present invention. As indicated by the socket 51-2, for example, each of the sockets having the power conversion function according to the present invention has a plurality of output functions and is adapted for supplying power of different specifications to a plurality of loads at the same time.

According to the present invention, the operating ease is offered to the user as products of a foreign countries having different power specifications are also made usable.

Figure 47:
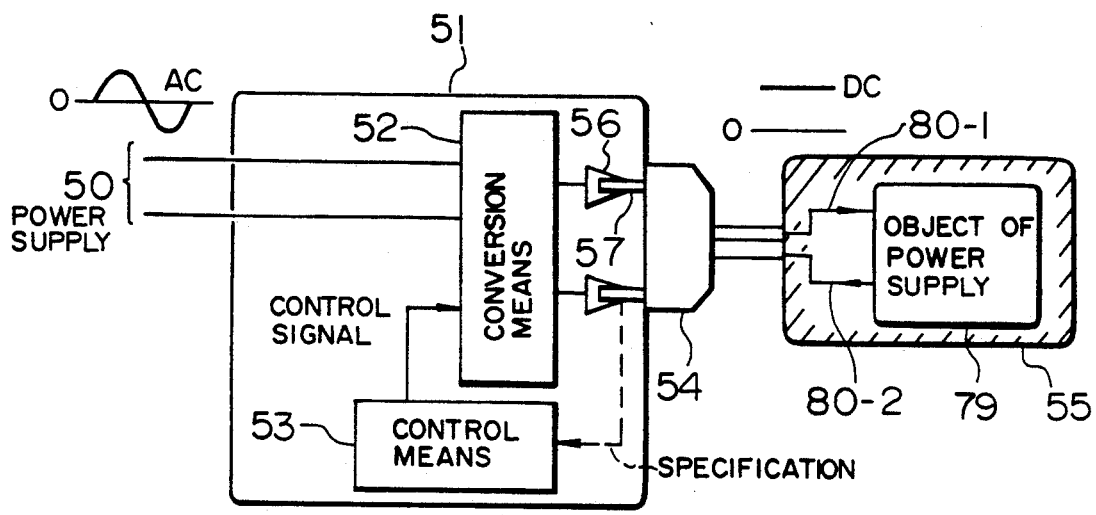
FIG. 47 shows a first embodiment relating to a power receiving system for a load according to the present invention.

The embodiment shown in FIG. 47 represents a load power receiving system with a socket having the power conversion function according to the present invention interposed between the system and a power supply. The configuration of this system is similar to that of the embodiment shown in FIG. 24 and therefore will not be described again. The feature of the present embodiment resides in the way the load 55 receives power. In the case where a load receives power through a socket from a power supply as in the prior art, it is necessary to interpose power conversion means such as a switching regulator between the plug 54 and an object of power supply 79 in the load 55. Further, a load requiring a stable voltage conventionally has an internal power conversion means.

According to the present embodiment, by contrast, it is sufficient to connect a line 80 between the plug 54 and the object of power supply 79 in the load 55 without providing any power conversion means in the load 55. The feature of the present embodiment therefore is that the interposition of a socket having the power conversion function according to the present invention between a load and a power supply eliminates the need of power conversion means like a switching regulator in the load. According to the present embodiment, the size of the load is thus reduced.

Figure 48:
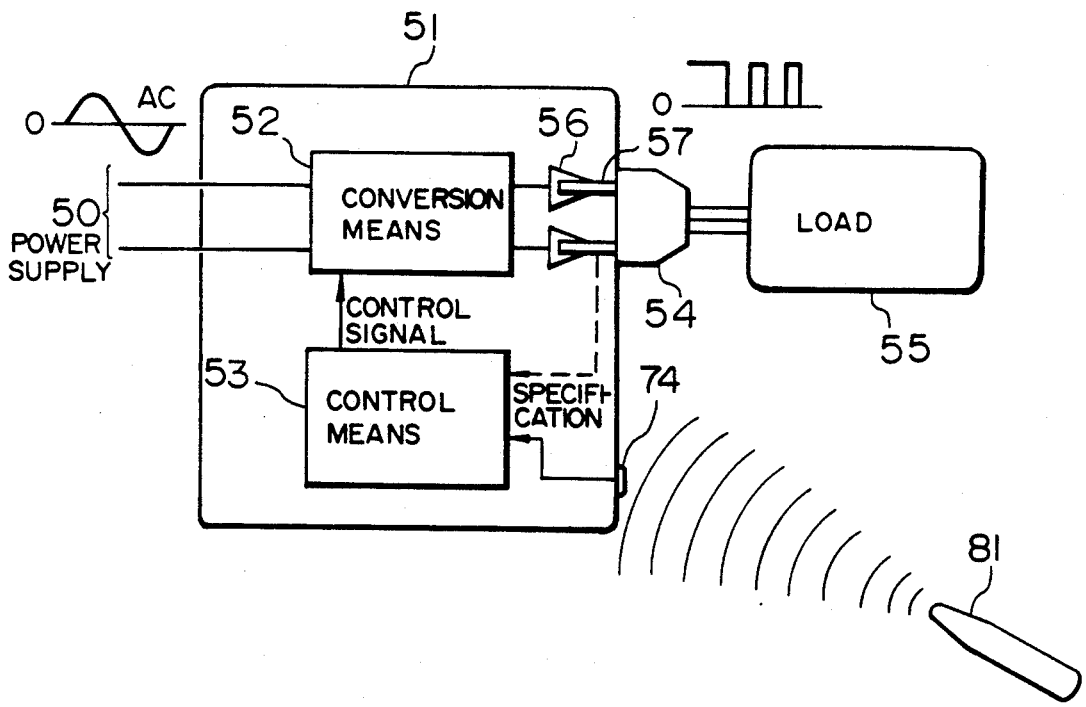
FIG. 48 shows a first embodiment relating to a load control system according to the present invention.
Figure 49:
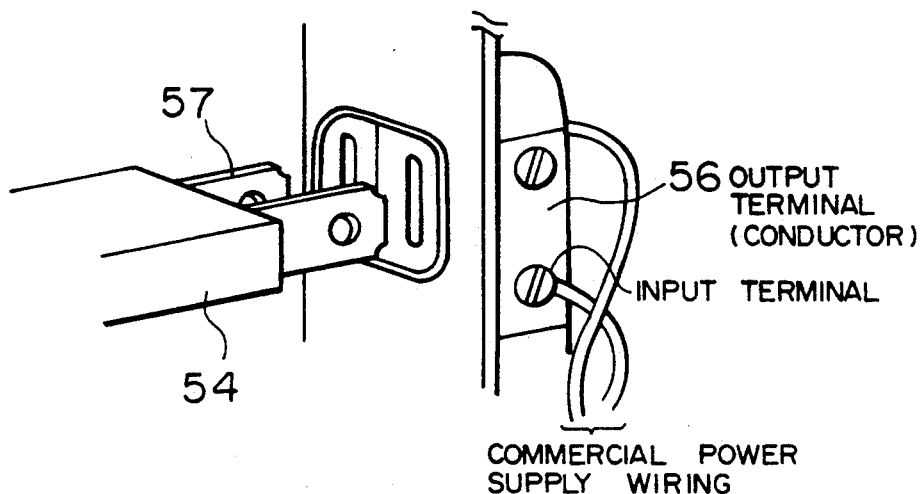
FIG. 49 shows a socket according to the prior art.
Figure 50:
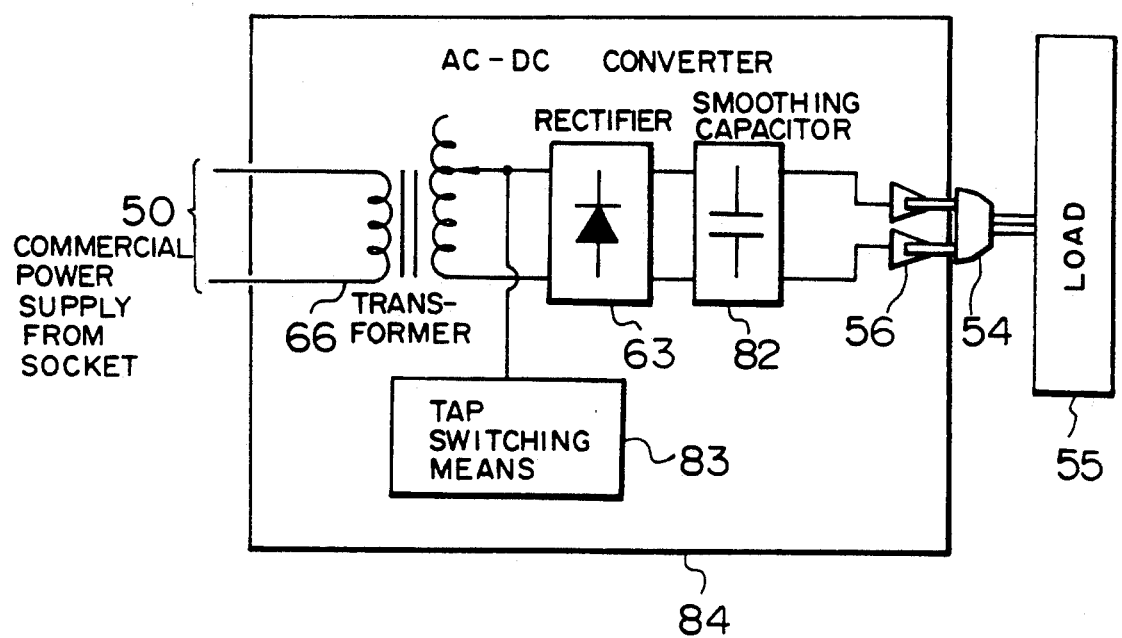
FIG. 50 shows an AC-DC converter according to the prior art.

The embodiment shown in FIG. 48 represents a load control system using the socket 51 having the power conversion function according to the present invention. This embodiment, like the one shown in FIG. 24, includes the socket 51 having the conversion means 52 and the control means 53. The feature of this embodiment lies in that a control signal is transmitted from an external signal transmission means 81 to signal receiving means 74 therein for controlling the load 55. The signal receiving means 74 may be incorporated either in the socket 51 or, like in the present embodiment, outside the socket 51 with equal effect. Also, the signal transmission means 81 may be either propagation means requiring no wiring like an electric wave, sound wave or light on the one hand, or an electrical signal using wiring on the other. According to the present embodiment, a command is transmitted from the signal transmission means 81 to the receiving means 74, which in turn applies the command to the control means. The command may represent any desired information such as supply or stoppage of electric power or a change in the power specification desired by the load. In this way, according to the present embodiment, a socket having the power conversion function is usable as load control means, thereby realizing a high function.

We claim:

1. A socket with a power conversion function interposed between a power supply and a load for transmitting electric power from the power supply to the load, said socket comprising means for converting the power from the power supply into a power of a given specification, means for controlling the conversion means in such a manner that the output of the conversion means may be of a specification required by the load, and means for supplying the output of the conversion means to the load, and further comprising memory means for storing a plurality of specifications required by the load and switch means for selecting a specification stored in the memory means as the specification required by the load.

2. A socket with a power conversion function, comprising:
    transformer means for transforming power, the transformer means having primary and secondary sides; and
    a converter connected to at least a selected one of the primary and second sides of the transformer means for changing the frequency of power on at least a selected one of the primary and secondary sides of the transformer means.

3. A socket with a power conversion function comprising:
    conversion means including at least
        rectifier means for rectifying power,
        smoothing means connected to the rectifier means for smoothing the rectified power,
        transformer means connected to the smoothing means for transforming the smoothed rectified power; and
        frequency changing means connected at least to the transformer means for changing a frequency of the transformed smoothed rectified power;
    means for detecting an output of the conversion means; and
    means for controlling the conversion means to make the output of the conversion means detected by the detecting means equal to a desired output of the conversion means.

4. A socket for interposition between a power supply and a load provided with terminal means, the socket enabling transmission via the terminal means of electric power from the power supply to the load, the socket comprising:
    receiving means for receiving from the load information of a specification of electric power required by the load;
    power conversion means for converting electric power supplied from the power supply into electric power of the specification by changing at least one of a voltage, a current, and a frequency of the electric power supplied from the power supply to at least one of a voltage, a current, and a frequency required by the load;
    control means, responsive to the information of the specification received by the receiving means, for controllably enabling the power conversion means to output the converted electric power of the specification; and
    means for transmitting the outputted electric power to the terminal means of the load.

5. A socket according to claim 4, wherein the information of the specification is coded information, and wherein the socket further comprises means for identifying the specification from the coded information.

6. A socket according to claim 5, wherein the load includes signal output means for outputting the coded information to the receiving means, and wherein the socket further comprises means for supplying electric power to the signal output means.

7. A socket according to claim 4, further comprising indication means for indicating the specification of the electric power required by the load.

8. A socket according to claim 4, further comprising:

a cover formed of an electrically insulating material for covering a connecting portion of the socket to be connected to the load, the connecting portion including at least the receiving means, the control means, and the power conversion means, in order to prevent possible exposure of the connecting portion; and a shield member provided on at least one of an interior surface and an exterior surface of the cover for preventing electromagnetic noise from leaking out of and entering into the connecting portion.

9. A socket according to claim 4, wherein the power conversion means includes means for rectifying an AC voltage received from the power supply into a DC voltage, and means for converting the DC voltage into the electric power of the specification required by the load.

10. A socket for interposition between a power supply and a load provided with terminal means, the socket enabling transmission via the terminal means of electric power from the power supply to the load, the socket comprising:

receiving means for receiving from the load information of a specification of electric power required by the load;

power conversion means for converting electric power supplied from the power supply into electric power of the specification;

control means, responsive to the information of the specification received by the receiving means, for controllably enabling the power conversion means to output the converted electric power of the specification; and means for transmitting the outputted electric power to the terminal means of the load;

wherein the power conversion means includes rectifier means receiving electric power from the power supply, smoothing means connected to the rectifier means, frequency conversion means connected to the smoothing means, transformer means connected to the frequency conversion means for outputting the electric power of the specification required by the load, and detection means for detecting a specification of the output electric power; and wherein the control means includes means for controlling the power conversion means on the basis of the information of the specification received by the receiving means and the specification detected by the detection means.

11. A socket according to claim 4, further comprising means for preventing transmission of electric power to the load until the specification of the electric power required by the load has been correctly detected from the information received by the receiving means.

12. A socket according to claim 4, wherein the information received by the receiving means includes information indicating a maximum current to be supplied to the load, and wherein the socket further comprises:

means, responsive to the information received by the receiving means, for detecting when a current supplied to the load is equal to the maximum current indicated by the information; and means, responsive to the detecting means, for maintaining the current supplied to the load at a current not higher than the maximum current.

13. A socket according to claim 4, wherein the information received by the receiving means includes information indicating a maximum current to be supplied to the load, and wherein the socket further comprises:

means, responsive to the information received by the receiving means, for detecting when a current supplied to the load is equal to the maximum current indicated by the information; and means, responsive to the detecting means, for interrupting the supply of power to the load when the detecting means detects the maximum current value.

14. A plug for connection to a socket, the plug having a function of transmitting information to the socket, the plug and the socket being for interposition between a load and a power supply, wherein the plug comprises signal output means for transmitting to the socket a specification of electric power required by the load, first power receiving means for receiving power from the socket to drive the signal output means, and second power receiving means for receiving power from the socket to drive the load.

15. A socket for interposition between a power supply and a load, the load including terminal means for receiving electric power and at least two signal output terminals for outputting an electric signal representative of a specification of electric power required by the load, the socket enabling electric power from the power supply to be supplied to the load, the socket comprising:

receiving means for receiving the electric signal outputted by the at least two signal output terminals of the load;

identifying means for identifying the specification of electric power required by the load on the basis of the received electric signal;

controllable power converting means for converting electric power supplied by the power supply into electric power of a controllable specification;

control means for controlling the controllable power converting means to convert the electric power supplied by the power supply into electric power of the specification required by the load on the basis of the specification identified by the identifying means; and supplying means for supplying the electric power converted by the controllable power converting means to the terminal means of the load.

16. A socket according to claim 15, wherein the power supply supplies an AC voltage, and wherein the controllable power converting means includes rectifying means for rectifying the AC voltage supplied by the power supply to produce a DC voltage, and controllable converting means for converting the DC voltage into electric power of a controllable specification.

17. A socket according to claim 15, wherein the power supply supplies an AC voltage and the load requires AC electric power;

wherein the controllable power converting means includes rectifying means for rectifying the AC voltage supplied by the power supply to produce a DC voltage, and controllable converting means for converting the DC voltage into AC electric power of a controllable specification including a controllable frequency; and wherein the control means includes detecting means for detecting a specification of the AC electric power converted by the controllable converting means, comparing means for comparing the specification detected by the detecting means with the specification identified by the identifying means and producing a comparison output, and means for controlling the controllable converting means to convert the DC voltage into AC electric power of the specification required by the load on the basis of the comparison output.

18. A socket according to claim 15, wherein the load further includes signal output means for outputting the electric signal representative of a specification of electric power required by the load to the at least two signal output terminals, the signal output means requiring electric power to operate, and wherein the socket further comprises means for supplying electric power to the signal output means of the load to enable the signal output means to operate.

19. A socket according to claim 15, wherein the load further include signal output means for outputting the electric signal representative of a specification of electric power required by the load to the at least two signal output terminals, the signal output means requiring electric power to operate, and means for supplying electric power to the signal output means to enable the signal output means to operate.

20. A socket according to claim 15, further comprising indicating means for indicating the specification of electric power required by the load on the basis of the specification identified by the identifying means.

21. A socket according to claim 15, wherein the specification of electric power required by the load includes a maximum current to be supplied to the load, and wherein the control means controls the controllable power converting means to supply a current to the load not greater than the maximum current.

22. A socket according to claim 15, wherein the specification of electric power required by the load includes a maximum current to be supplied to the load, and wherein the control means controls the controllable power converting means to stop supplying electric power to the load when a current supplied to the load from the controllable power converting means exceeds the maximum current.

23. A socket for interposition between a power supply supplying an AC voltage and a load, the load including terminal means for receiving electric power and specification output means for outputting a specification of electric power required by the load, the socket enabling electric power from the power supply to be supplied to the load, the socket comprising:
receiving means for receiving the specification of electric power required by the load outputted by the specification output means of the load;
rectifying means for rectifying the AC voltage supplied by the power supply to produce a DC voltage;
controllable power converting means for converting the DC voltage into electric power of a controllable specification;
control means for controlling the controllable power converting means to convert the DC voltage into electric power of the specification required by the load on the basis of the specification received by the receiving means; and
supplying means for supplying the electric power converted by the controllable power converting means to the terminal means of the load.

24. A socket for interposition between a power supply supplying an AC voltage and a load requiring AC electric power, the load including terminal means for receiving electric power and specification output means for outputting a specification of AC electric power required by the load, the socket enabling electric power from the power supply to be supplied to the load, the socket comprising:
receiving means for receiving the specification of AC electric power required by the load outputted by the specification output means of the load;
rectifying means for rectifying the AC voltage supplied by the power supply to produce a DC voltage;
controllable power converting means for converting the DC voltage into AC electric power of a controllable specification including a controllable frequency;
control means for controlling the controllable power converting means to convert the DC voltage into AC electric power of the specification required by the load on the basis of the specification received by the receiving means; and
supplying means for supplying the AC electric power converted by the controllable power converting means to the terminal means of the load.

25. A plug for connection to a socket, the plug and the socket being for interposition between a load and a power supply, the plug comprising:
signal output means for outputting an electric signal representing information;
at least two signal output terminals connected to the signal output means for receiving the electric signal and outputting the electric signal to the socket; and
terminals for receiving electric power from the power supply via the socket and supplying the received electric power to the load.

26. A plug for connection to a socket, the plug and the socket being for interposition between a load and a power supply, the plug comprising:
signal output means for converting a specification of electric power required by the load to a coded signal and outputting the coded signal to the socket, the signal output means requiring electric power to operate; and
means for receiving electric power from the socket to enable the signal output means to operate.

27. A plug for connection to a socket, the plug comprising:
terminal means for receiving electric power from the socket;
at least two signal output terminals;
signal output means connected to the at least two signal output terminals for outputting an electric signal representing information via the at least two signal output terminals; and
means for receiving electric power from a power supply provided in the socket to enable the signal output means to operate.

* * * * *